United States Patent
Flannery et al.

(10) Patent No.: US 6,497,258 B1
(45) Date of Patent: Dec. 24, 2002

(54) CABLE TIE INSTALLATION TOOL

(75) Inventors: Steven E. Flannery, Wayland, MA (US); John Franks, Hopkinton, MA (US); Andrew Pines, Chicago, IL (US); Philip M. Anthony, III, Chicago, IL (US)

(73) Assignee: Avery Denmson Corporation, Pasadena, CA (US)

( * ) Notice: Subject to any disclaimer, the term of this patent is extended or adjusted under 35 U.S.C. 154(b) by 0 days.

(21) Appl. No.: 09/875,810

(22) Filed: Jun. 6, 2001

Related U.S. Application Data

(60) Provisional application No. 60/134,149, filed on May 14, 1999, provisional application No. 60/143,863, filed on Jul. 15, 1999, and provisional application No. 60/144,504, filed on Jul. 19, 1999.

(51) Int. Cl.⁷ .................................................. B21F 9/00
(52) U.S. Cl. ................................... 140/123.6; 140/93.2
(58) Field of Search .............................. 140/93.2, 123.6

(56) References Cited

U.S. PATENT DOCUMENTS

| | | |
|---|---|---|
| 3,670,782 A | 6/1972 | Kabel |
| 3,694,863 A | 10/1972 | Wasserlein, Jr. |
| 3,766,608 A | 10/1973 | Fay |
| 3,976,108 A | 8/1976 | Caveney et al. |
| 4,287,644 A | 9/1981 | Durand |
| 4,347,648 A | 9/1982 | Dekkers |
| 4,371,010 A | 2/1983 | Hidassy |
| 4,754,529 A | 7/1988 | Paradis |
| 4,788,751 A | 12/1988 | Shely et al. |
| 4,901,775 A * | 2/1990 | Scott et al. ............... 140/123.5 |
| 5,102,075 A | 4/1992 | Dyer |
| 5,205,328 A | 4/1993 | Johnson et al. |
| 5,544,391 A | 8/1996 | Hoffman |
| 5,595,220 A | 1/1997 | Leban et al. |
| 5,628,348 A * | 5/1997 | Scott et al. ............... 140/123.6 |
| 5,669,111 A | 9/1997 | Rohaly |
| 5,803,413 A | 9/1998 | Benoit et al. |
| 5,836,053 A | 11/1998 | Davignon et al. |
| 5,845,681 A | 12/1998 | Kurmis |
| 5,909,751 A * | 6/1999 | Teagno ..................... 140/123.6 |
| 5,915,425 A | 6/1999 | Nilsson et al. |
| 5,944,063 A | 8/1999 | Kurmis |

FOREIGN PATENT DOCUMENTS

GB   2040352 A   8/1980

* cited by examiner

*Primary Examiner*—Lowell A. Larson
(74) *Attorney, Agent, or Firm*—Kriegsman & Kriegsman

(57) ABSTRACT

A cable tie installation tool for forming a cable tie into a closed loop around a plurality of objects includes a housing which is adapted to receive an individually loaded cable tie. A transport assembly driven by a first motor advances the tail of the cable tie around the objects to be bundled. A jaw assembly driven by a second motor guides the tail through the head to form the cable tie into a closed loop around the desired bundle. A cinch assembly driven by the first motor further advances the tail through the head so as to reduce the size of the closed loop around the desired bundle. A control circuit electrically monitors the tension level of the closed loop around the bundle by measuring the current draw of the first motor. The control circuit limits the tension of the closed loop around the bundle to a user adjustable, desired tension level. Once the control circuit detects the desired tension level, the control circuit causes a cut assembly to sever the excess portion of the tail fed through the head.

15 Claims, 13 Drawing Sheets

CABLE TIE INSTALLATION TOOL

CROSS-REFERENCE TO RELATED APPLICATIONS

This application claims the priority of provisional patent application Ser. No. 60/134,149, which was filed on May 14, 1999 in the names of Charles L. Deschenes, John R. Franks and Paul A. Davignon, provisional patent application Ser. No. 60/143,863, which was filed on Jul. 15, 1999 in the names of Charles L. Deschenes, John R. Franks and Paul A. Davignon, provisional patent application Ser. No. 60/144,504, which was filed on Jul. 19, 1999 in the names of Charles L. Deschenes and John R. Franks, non-provisional patent application Ser. No. 09/569,809, which was filed on May 12, 2000 in the names of Charles L. Deschenes, John R. Franks and Paul A. Davignon, now U.S. Pat. No. 6,302,157, and non-provisional patent application Ser. No. 09/569,810, which was filed on May 12, 2000 in the names of Charles L. Deschenes and John R. Franks.

BACKGROUND OF THE INVENTION

The present invention relates generally to cable ties and more particularly to a cable tie used in conjunction with a cable tie installation tool.

Cable ties, also known as harnessing devices, are well known devices and are commonly used in the art for holding together a bundle of objects, such as wires or cables.

One type of cable tie which is well known and widely used in the art comprises an elongated strip of plastic material having rectangular head at one end and a serrated tail at the other end. Feeding the tail of the tie through a strap receiving channel formed in the head results in the cable tie taking the shape of a loop with the serrations of the tail engaging and being locked in position by a pawl inside the head, the tail being incapable of removal once it is inserted in the head.

In U.S. Pat. No. 4,754,529 to J. R. Paradis, which is incorporated herein by reference, there is disclosed a bundling of objects using a harnessing device with a locking head and a strap with teeth that are controlled by stretching. The locking head contains a pawl or tang that engages the teeth of the strap by wedging. One or more wedging teeth are desirably located on the locking tang as well. A further tooth to promote locking is desirably included in the locking head. The strap is advantageously molded of stretch reorientable material which is subsequently stretched to control the profile of the teeth which are engaged by the locking tang and head. The teeth are spaced on the strap to permit use of the teeth near the head for the harnessing of small bundles. The pawl is provided with specified pivot points for both the insertion and loading of the strap in the head.

Another type of cable tie which is well known and widely used in the art comprises an apertured strap fitted to a buckle-like head, with a tongue that enters the apertures of the strap.

In U.S. Pat. No. 3,766,608 to R. B. Fay, which is incorporated herein by reference, there is disclosed a tie formed by a locking head and an attached ladder strap. The head contains a longitudinal guide channel for receiving the strap, after encirclement of items to be bundled, and an internal locking tang. The latter is deflected with respect to relatively narrow auxiliary channels on opposite sides of the guide channel. One of the auxiliary channels receives the locking tang during the bundling of the items; the other auxiliary channel contains a stop against which the locking tang becomes abutted in planar engagement by the reverse thrust of the harnessed items.

In U.S. Pat. No. 4,347,648 to L. P. Dekkers, which is incorporated herein by reference, there is disclosed a tie formed by a locking head and an attached ladder strap. The head contains a locking tang and a guide channel that receives the strap after encirclement of items to be bundled. The tang engages the rungs of the ladder strap for the adjustable retention of the items. The free end of the strap has a light-weight webbed tail that facilitates the insertion of the strap into the head. The strap is advantageously molded of a stretch reorientable material and is subsequently stretched to produce a suitable strengthening and elongation of the webbed tail.

Cable ties of the type described above are often wrapped around a bundle of objects using a portable cable tie installation tool. As can be appreciated, a cable tie installation tool facilitates the ease in which an operator can feed the tail of a cable tie through its associated head and cinch the closed loop cable tie around a desired bundle, which is highly desirable.

Cable tie installation tools typically comprise a housing which is adapted to receive a cable tie, a transport assembly which advances the tail of the cable tie around the plurality of objects to be bundled, a jaw assembly which guides the tail through the head to form the cable tie into a closed loop around the desired bundle, a cinch assembly which further advances the tail through the head so as to reduce the size of the closed loop around the desired bundle, and a cut assembly which severs the excess portion of the tail fed through the head when the cable tie is formed into a closed loop around the desired bundle.

It should be noted that cable tie installation tools of the type described above often include one or more electric motors which derive their power from a power cord or a battery pack that is either disposed within the housing or carried by the operator. In use, the one or more electric motors may be used to drive the transport assembly, the jaw assembly, the cinch assembly and the cut assembly.

It should also be noted that cable tie installation tools of the type described above are often used in conjunction with a continuous clip, or strip, of interconnected cable ties. As can be appreciated, cable tie installation tools which are used in conjunction with a continuous clip of cable ties typically include a motor driven mechanism for separating an individual cable tie from the remaining clip of cable ties.

During use of cable tie installation tools of the type described above, it has been found to be desirable to be able to adjust the tension level of the closed loop formed by the cable tie around the bundle. In particular, it has been found to be desirable to be able to terminate activation of the cinch assembly and to actuate the cut assembly of the cable tie installation tool at a precise, operator selected tension level.

Accordingly, it is well known in the art for cable tie installation tools to include means for adjusting the tension level of the closed loop formed by a cable tie around a desired bundle.

As an example, cable tie installation tools often utilize mechanical means for controlling the tension level of the closed loop formed by a cable tie around a desired bundle. Specifically, cable tie installation tools often comprise a mechanical piece which physically contacts the cinching mechanism. As a result, the physical contact of the mechanical piece onto the cinching mechanism serves to add enough friction so as to regulate the tension of the closed loop of the cable tie around the bundle.

Prior art cable tie installation tools which utilize mechanical means to control the tension level of the closed loop formed by a cable tie around a desired bundle are well known and are commonly used in commerce. However, it has been found that cable tie installation tools which utilize mechanical means to control the tension level of the closed loop formed by a cable tie around a desired bundle suffer from a couple notable drawbacks.

As a first drawback, it has been found that cable tie installation tools which utilize mechanical means to control the tension level of the closed loop formed by a cable tie around a desired bundle are difficult to control, which is highly undesirable. Specifically, it has been found to be difficult to accurately and consistently control the precise level of tension in which a cable tie wraps around a desired bundle using a mechanical piece which frictionally engages the cinch assembly.

As a second drawback, it has been found that cable tie installation tools which utilize mechanical means to control the tension level of the closed loop formed by a cable tie around a desired bundle provide the cable tie installation tool with a limited range of user selectable tension levels, which is highly undesirable.

SUMMARY OF THE INVENTION

It is an object of the present invention to provide a new and improved cable tie installation tool.

It is another object of the present invention to provide a new and improved cable tie installation tool which can be used to wrap a cable tie around a bundle of two or more objects.

It is yet another object of the present invention to provide a cable tie installation tool as described above which has a limited number of parts, is inexpensive to manufacture and is easy to use.

It is yet still another object of the present invention to provide a cable tie installation tool which allows for the operator to adjust the tension level of the closed loop formed by the cable tie around the bundle.

It is another object of the present invention to provide a cable tie installation tool which allows for the operator to accurately control the precise tension level of the closed loop formed by the cable tie around the bundle.

It is yet another object of the present invention to provide a cable tie installation tool which allows for a wide range of user selectable tension levels of the closed loop formed by the cable tie around the bundle.

Accordingly, there is provided a cable tie installation tool for fastening a cable tie around a plurality of objects, said cable tie comprising a head and a tail formed onto said head, said head being adapted to cooperate with said tail to form a closed loop around the plurality of objects, said cable tie installation tool comprising a first motor, a second motor, a jaw assembly driven by said first motor, said jaw assembly being adapted to guide the tail around the plurality of objects and through its associated head to form the cable tie into a closed loop around the plurality of objects, a transport assembly driven by said second motor, said transport assembly advancing the cable tie into said jaw assembly, a cinch assembly driven by said second motor, said cinch assembly advancing the tail through the head so as to reduce the size of the closed loop around the plurality of objects, a control circuit for controlling operation of said first motor and said second motor, said control circuit electrically monitoring the tension level of the closed loop around the bundle, said control circuit establishing a desired tension level, and a cut assembly for severing the excess portion of the tail fed through the head when said control circuit detects the desired tension level of the closed loop around the plurality of objects.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings, wherein like reference numerals represent like parts.

DETAILED DESCRIPTION OF A PREFERRED EMBODIMENT

Cable Tie

Figure 1:
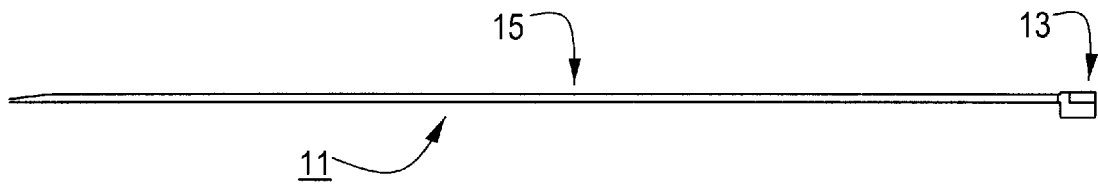
FIG. 1 is a side view of a first embodiment of a cable tie constructed according to the teachings of the present invention.

Referring now to the drawings, there is shown in FIGS. 1–6, a first embodiment of a cable tie constructed according to the teachings of the present invention, the cable tie being identified by reference numeral 11. In use, cable tie 11 can be formed into a loop to wrap a bundle of objects $O_b$, such as cables or wires.

As will be described further in detail below, cable tie 11 is designed to be used in conjunction with a preferred cable tie installation tool constructed according to the teachings of the present invention, the preferred cable tie installation tool being identified by reference numeral 12. However, it is to be understood that cable tie 11 is not limited to being wrapped around a bundle of objects using cable tie installation tool 12. Rather, cable tie 11 could be wrapped around a bundle of objects by alternative means, such by manual installation or using other well known types of cable tie installation tools, without departing from the spirit of the present invention.

Cable tie 11 is preferably constructed of a durable and flexible material, such as plastic, and comprises a head 13 and a tail 15.

Head 13 comprises a generally flat top surface 17, a generally flat bottom surface 19, a strap accepting channel 20, an inner wall 21, a first sidewall 23-1, a second sidewall 23-2, an end wall 25 and a locking pawl 26 disposed to project into strap accepting channel 20.

Strap accepting channel 20 is sized and shaped to enable tail 15 to be fed therethrough, thereby enabling cable tie 11 to be formed into a closed loop. As will be described further in detail below, locking pawl 26 is disposed to project into strap accepting channel 20 and lockably engage tail 15, thereby precluding tail 15 from being backed out of head 13. Locking pawl 26 is preferably a flexible locking pawl; however, it is to be understood that pawl 26 could be replaced with alternative types of locking devices, such as a fixed pawl, without departing from the spirit of the present invention.

Figure 2:
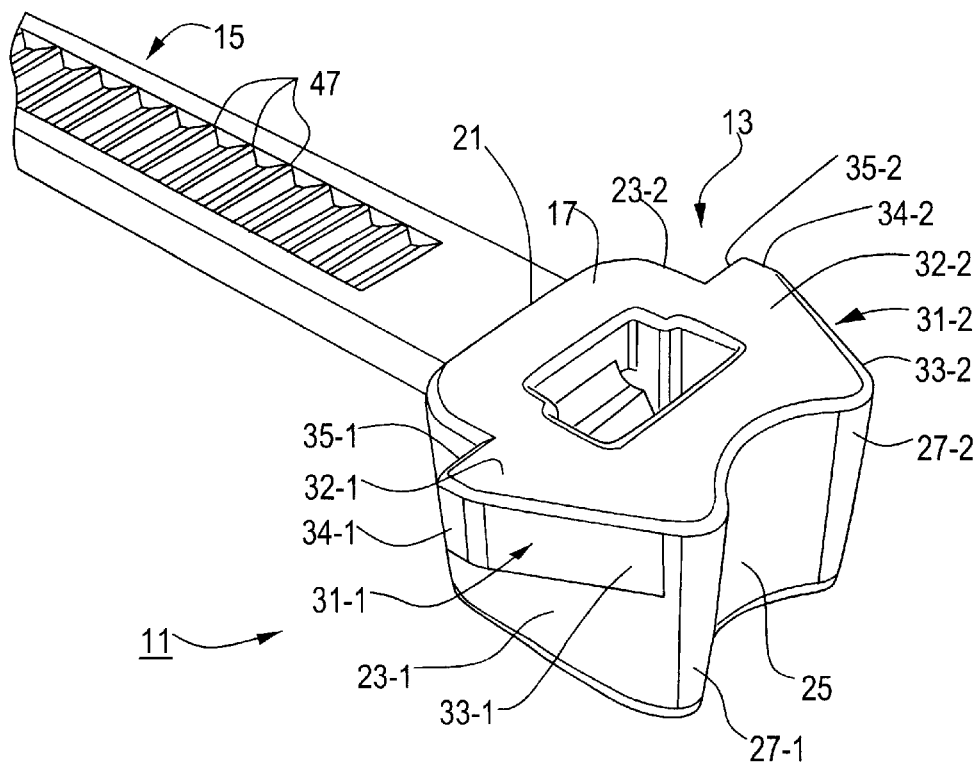
FIG. 2 is an enlarged, fragmentary, top perspective view of the cable tie shown in FIG. 1.
Figure 3:
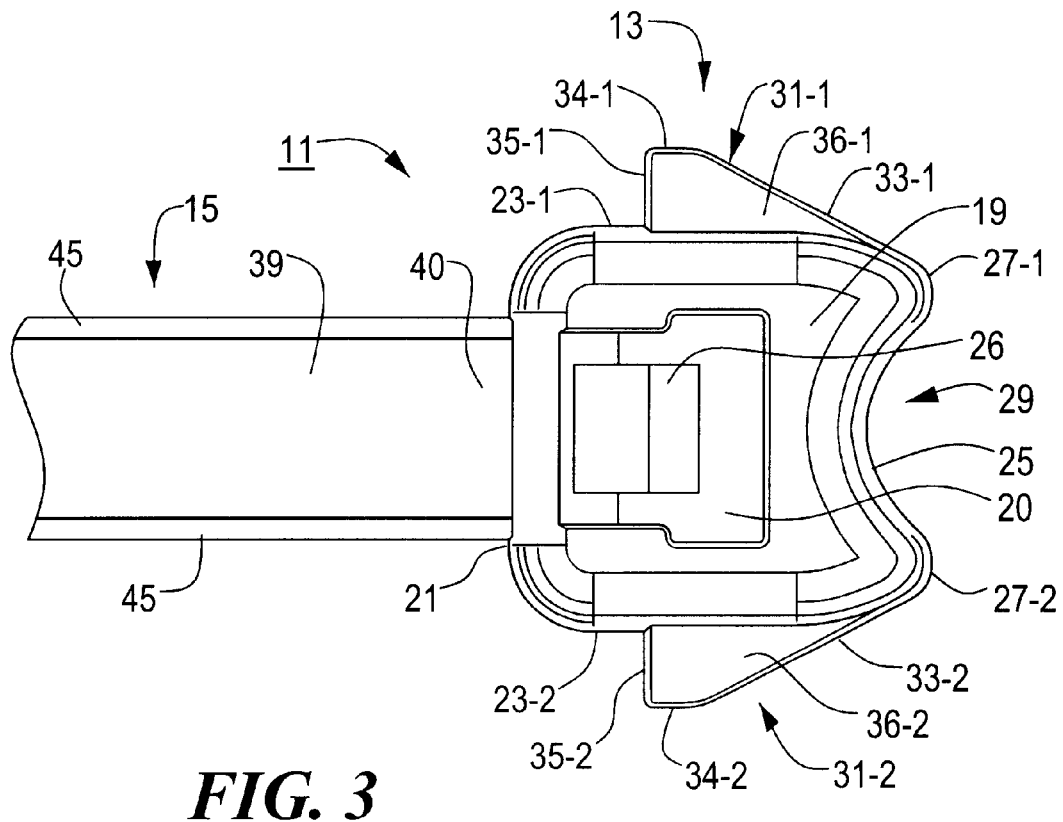
FIG. 3 is an enlarged, fragmentary, bottom view of the cable tie shown in FIG. 1.

End wall 25 is shaped to include first and second significantly curved, or rounded, corners 27-1 and 27-2 at its junction with sidewalls 23-1 and 23-2, respectively, as shown in FIGS. 2 and 3. It should be noted that curved corners 27 provide end wall 25, and consequently head 13, with a generally rounded shape. As can be appreciated, the rounded shape of head 13 is important in the use of cable tie 11 in conjunction with cable tie installation tool 12. Specifically, the rounded shape of end wall 25 enables head 13 to fit snugly within a circular opening formed in the transport belt of cable tie installation tool 12, as will be described further in detail below.

End wall 25 is inwardly curved so as to define a curved recess 29 between rounded corners 27. As can be appreciated, the inward curvature of end wall 25 serves to reduce the amount of material required to form cable tie 11, thereby decreasing the overall cost in manufacturing cable tie 11, which is an object of the present invention.

Cable tie 11 further comprises a first outwardly protruding wing 31-1 which is formed onto and extends out from first sidewall 23-1 and a second outwardly protruding wing 31-2 which is formed onto and extends out from second sidewall 23-2. First and second outwardly protruding wings 31 are preferably integrally formed onto head 13. However, it is to be understood that wings 31 could be alternatively formed onto head 13 without departing from the spirit of the present invention.

Outwardly protruding wing 31-1 includes a flat top surface 32-1. Similarly, outwardly protruding wing 31-2 which includes a flat top surface 32-2. As shown in FIG. 2, top surfaces 31-1 and 31-2 lie flush with top surface 17 of head 13.

Outwardly protruding wing 31-1 is shaped to include a first side panel 33-1, a second side panel 34-1 and third side panel 35-1, as shown in FIG. 3. First side panel 33-1 is generally flat and extends from rounded corner 27-1 at an acute angle away from sidewall 23-1, first side panel 33-1 having a length which is approximately ½ the length of head 13. Second side panel 34-1 is generally flat and extends from first side panel 33-1 at an angle such that second side panel 34-1 is disposed in parallel with sidewall 23-1. Third side panel 35-1 is generally flat and extends from second side panel 34-1 at an angle such that third side panel 35-1 projects perpendicularly into sidewall 23-1.

Similarly, outwardly protruding wing 31-2 is shaped to include a first side panel 33-2, a second side panel 34-2 and third side panel 35-2, as shown in FIG. 3. First side panel 33-2 is generally flat and extends from rounded corner 27-2 at an acute angle away from sidewall 23-2, first side panel 33-2 having a length which is approximately ½ the length of head 13. Second side panel 34-2 is generally flat and extends from first side panel 33-2 at an angle such that second side panel 34-2 is disposed in parallel with sidewall 23-2. Third side panel 35-2 is generally flat and extends from second side panel 34-2 at an angle such that third side panel 35-2 projects perpendicularly into sidewall 23-2.

It should be noted that, in this manner, each of third side panels 35 forms a flat, engagement surface which is of significance in the use of cable tie 11 in conjunction with cable tie installation tool 12. Specifically, each of third side panels 35 is sized, shaped and orientated to abut against an associated hard alignment stop formed in the housing of cable tie installation tool 12 so as to limit the forward displacement of cable tie 11 by the transportation belt of tool 12. As such, the abutment of third side panels 35 against the hard alignment stops in the housing serves to properly align head 13 of cable tie 11 within tool 12 during the cable tie bundling, or wrapping, process, as will be described further in detail below.

It should also be noted that each of outwardly protruding wings 31 is not limited to the particular arrangement of side panels 33, 34 and 35. Rather, the total number, size, shape and orientation of side panels for wings 31 could be modified without departing from the spirit of the present invention.

Figure 4:
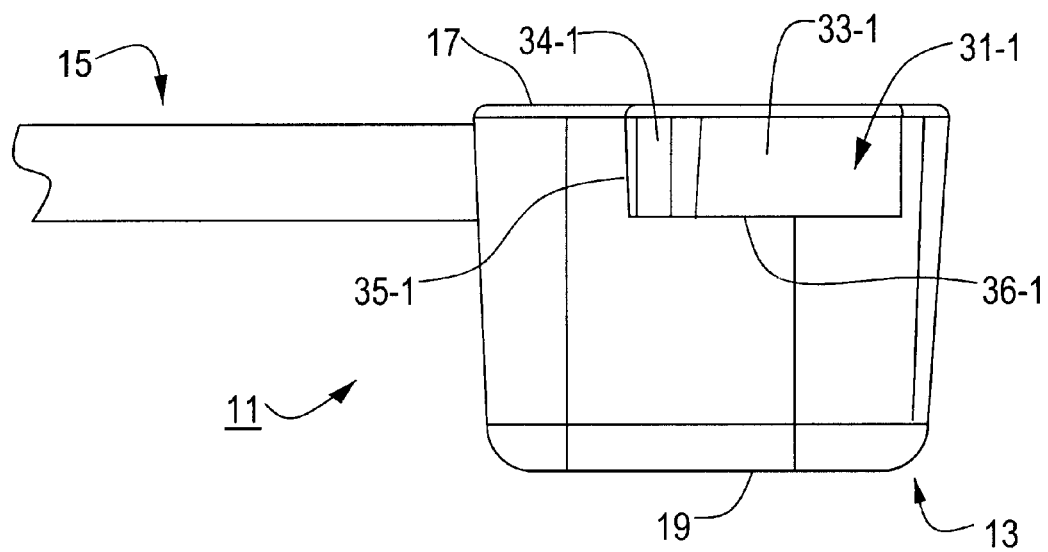
FIG. 4 is an enlarged, side view of the cable tie shown in FIG. 1.
Figure 5:
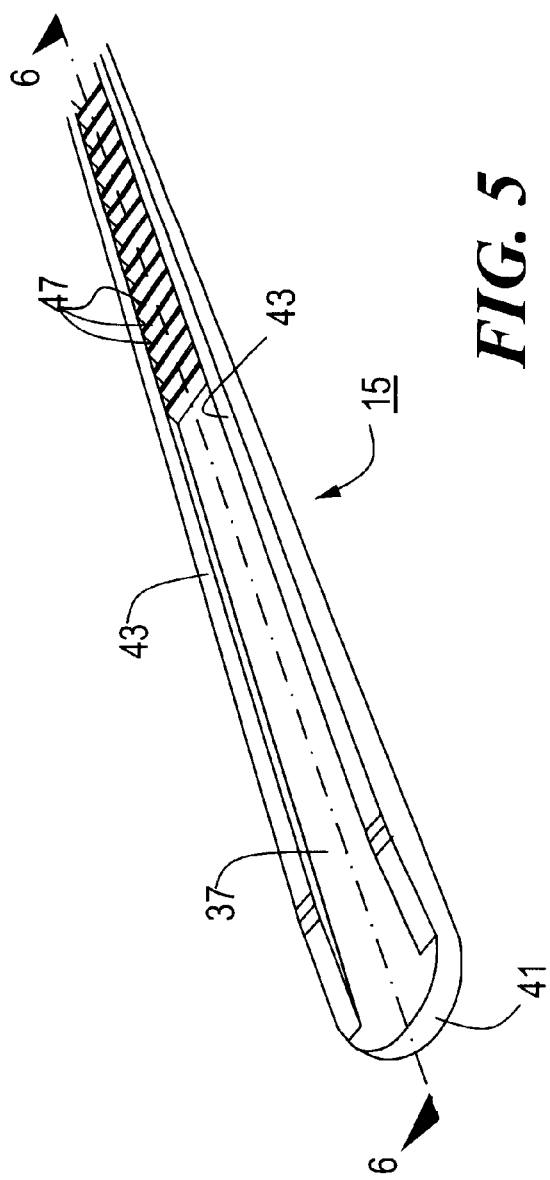
FIG. 5 is an enlarged, fragmentary, top perspective view of the cable tie shown in FIG. 1.

Outwardly protruding wing 31-1 is further shaped to include a bottom surface 36-1. Bottom surface 36-1 is generally flat and extends perpendicularly out from sidewall 23-1 approximately one-quarter of the distance down from top surface 17 to bottom surface 19, as shown in FIG. 4. Similarly outwardly protruding wing 31-2 is further shaped to include a bottom surface 36-2. Bottom surface 36-2 is generally flat and extends perpendicularly out from sidewall 23-2 approximately one-quarter of the distance down from top surface 17 to bottom surface 19, as shown in FIG. 4.

It should be noted that, in this manner, each bottom surface 36 forms a support surface which is of significance in the use of cable tie 11 in conjunction with cable tie installation tool 12. Specifically, bottom surfaces 36 of outwardly protruding wings 31 are sized, shaped and orientated to lie on top of the transportation belt of cable tie installation tool 12. As such, bottom surfaces 36 of outwardly protruding wings 31 serve as a support means for preventing head 13 of cable tie 11 from falling through the circular opening provided in the transportation belt of tool 12.

Tail 15 comprises a top surface 37, a bottom surface 39, a first end 40, a free end 41, a first pair of rails 43 formed on top surface 37, a second pair of rails 45 formed on bottom surface 37 and a plurality of ratchet teeth 47 formed on top surface 37 between first pair of rails 43.

First end 40 of tail 15 is connected to inner wall 21 of head 13 to make cable tie 11 a unitary device. Preferably, first end 40 of tail 15 is integrally formed onto inner wall 21 of head 13 using conventional cable tie manufacturing techniques, such as injection molding.

Figure 6:
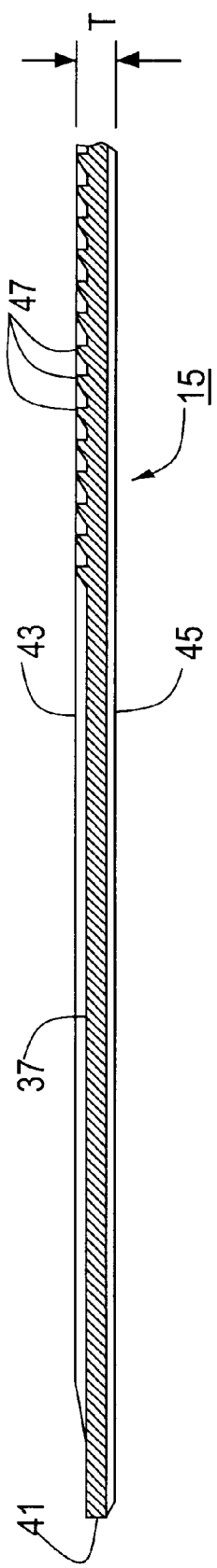
FIG. 6 is a side section view of the cable tie shown in FIG. 5, taken along lines 6—6.

First pair of rails 43 and second pair of rails 45 extend nearly the entire length of tail 15 and terminate at free end 41. First pair of rails 43 taper slightly at free end 41, but otherwise, the extension of first and second pairs of rails 43 and 45 to free end 41 provides tail 15 with a nearly uniform cross-sectional area, or thickness T, as shown in FIG. 6. Furthermore, the extension of first and second pairs of rails 43 and 45 to free end 41 serves to increase the overall thickness T of tail 15 without significantly compromising the flexibility of cable tie 11.

Plurality of ratchet teeth 47 are sized and shaped to be engaged by locking pawl 26 to prevent tail 15 from being backed out of strap accepting channel 20 of head 13 when cable tie 11 is formed into a closed loop. Although cable tie 11 is shown comprising ratchet teeth 47, it is to be understood that tail 15 could comprise alternative means for engaging pawl 26, such as a ladder construction, without departing from the spirit of the present invention.

As can be appreciated, the relatively large and nearly uniform thickness T of tail 15 provides an important advantage in the use of cable tie 11 in conjunction with cable tie installation tool 12. Specifically, the relatively large and nearly uniform thickness of tail 15 enables a pair of spaced apart, fixed, cinch knurls in tool 12 to advance tail 15 through head 13 without the cinch knurls damaging any portion of tail 15.

Figure 7:
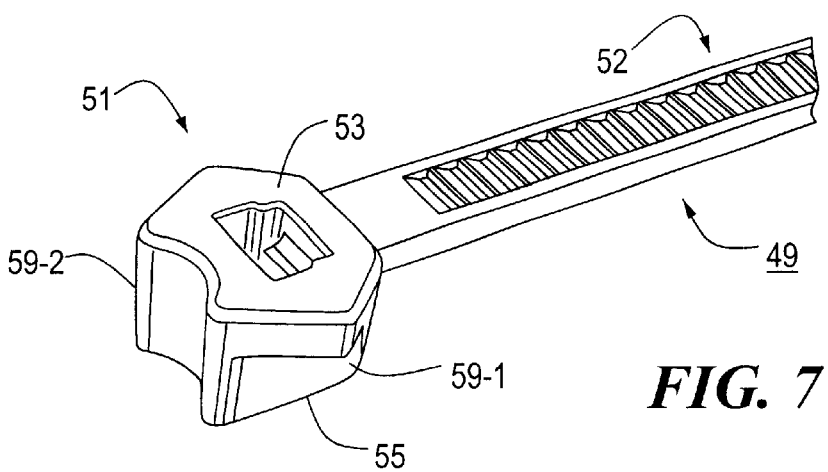
FIG. 7 is an enlarged, fragmentary, top perspective view of a second embodiment of a cable tie constructed according to the teachings of the present invention.
Figure 8:
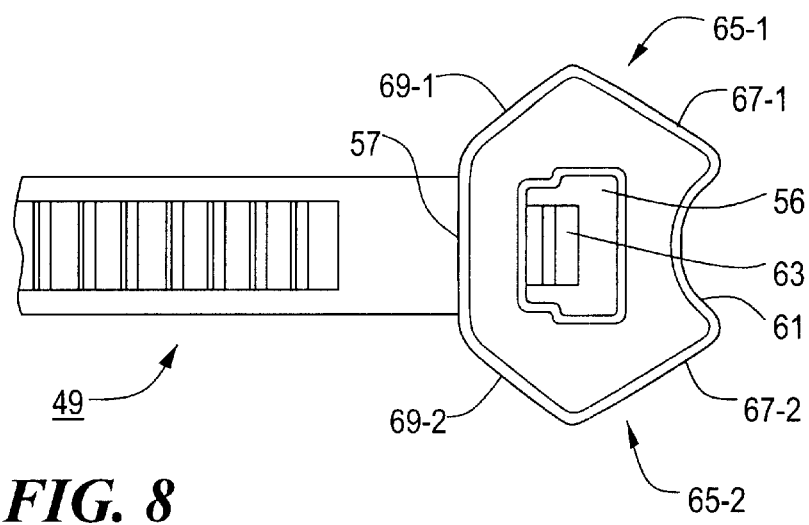
FIG. 8 is an enlarged, fragmentary, top view of the cable tie shown in FIG. 7.

As noted above, each of outwardly protruding wings 31 is not limited to the particular arrangement of side panels 33, 34 and 35. Rather, the total number, size, shape and orientation of the side panels for wings 31 could be modified without departing from the spirit of the present invention. Accordingly, FIGS. 7 and 8 show a second embodiment of a cable tie constructed according to the teachings of the present invention, the cable being identified by reference numeral 49.

Cable tie 49 comprises a head 51 and a tail 52. Head 51 comprises a generally flat top surface 53, a generally flat bottom surface 55, a strap accepting channel 56, an inner wall 57, a first sidewall 59-1, a second sidewall 59-2, an end wall 61 and a locking pawl 63.

Cable tie 49 further comprises a first outwardly protruding wing 65-1 which is formed onto and extends out from first sidewall 59-1 and a second outwardly protruding wing 65-2 which is formed onto and extends out from second sidewall 59-2.

Cable tie 49 differs from cable tie 11 only in that wings 65 have a different number, size, shape and orientation of side panels than wings 31 of cable tie 11.

Specifically, first outwardly protruding wing 65-1 is shaped to include a first side panel 67-1 and a second side panel 69-1. First side panel 67-1 is generally flat and extends from end wall 51 at an acute angle away from sidewall 59-1, first side panel 67-1 having a length which is approximately ½ the total length of head 51. Second side panel 69-1 is generally flat and extends at an acute angle away from first side panel 67-1 and terminates at the junction of inner wall 57 and sidewall 59-1.

Similarly, second outwardly protruding wing 65-2 is shaped to include a first side panel 67-2 and a second side panel 69-2. First side panel 67-2 is generally flat and extends from end wall 61 at an acute angle away from sidewall 59-2, first side panel 67-2 having a length which is approximately ½ the total length of head 51. Second side panel 69-2 is generally flat and extends at an acute angle away from first side panel 67-2 and terminates at the junction of inner wall 57 and sidewall 59-2.

Cable Tie Installation Tool

Figure 9:
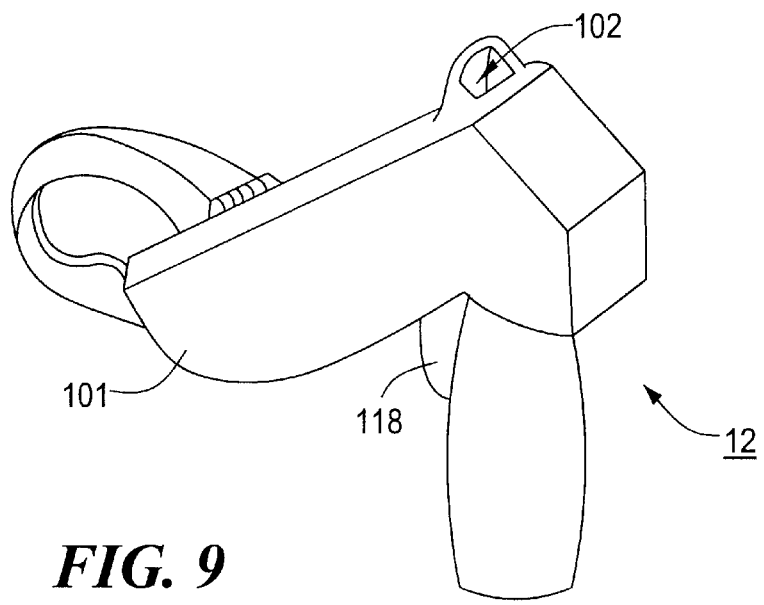
FIG. 9 is a front perspective view of a cable tie installation tool constructed according to the teachings of the present invention.

Referring now to the drawings, there is shown in FIG. 9 novel cable tie installation tool 12. As noted above, cable tie installation tool 12 is designed to be used in conjunction with cable tie 11. Specifically, cable tie installation tool 12 performs a fully automatic installation of an individually loaded cable tie 11 around a desired bundle of objects. However, it is to be understood that cable tie installation tool 12 is not limited to using cable tie 11. Rather, cable tie installation tool 12 could use alternative types of conventional cable ties without departing from the spirit of the present invention.

As will be described further in detail below, cable tie installation tool 12 comprises a housing 101 for protecting internal components of tool 12, a transport assembly 103 for advancing an individually loaded cable tie 11 through tool 12, a jaw assembly 105 for guiding tail 15 through head 13 to form cable tie 11 into a closed loop around a desired bundle, a cinch assembly 107 for advancing tail 15 further through head 13 so as to reduce the size of the closed loop of tie 11 around the desired bundle, a control circuit 109 for controlling the principal operations of tool 12 and a cut assembly 111 for severing the excess portion of tail 15 once cable tie 11 reaches a user selected tension level around bundle of objects $O_b$.

Housing for the Cable Tie Installation Tool

Cable tie installation tool 12 comprises a housing 101 constructed of a hard and durable material, such as plastic.

As can be appreciated, housing 101 serves to protect internal components of tool 12 disposed therewithin. Preferably, housing 101 is ergonomically designed to facilitate holding tool 12 in the hand of the operator.

Transport Assembly for the Cable Tie Installation Tool

Figure 10:
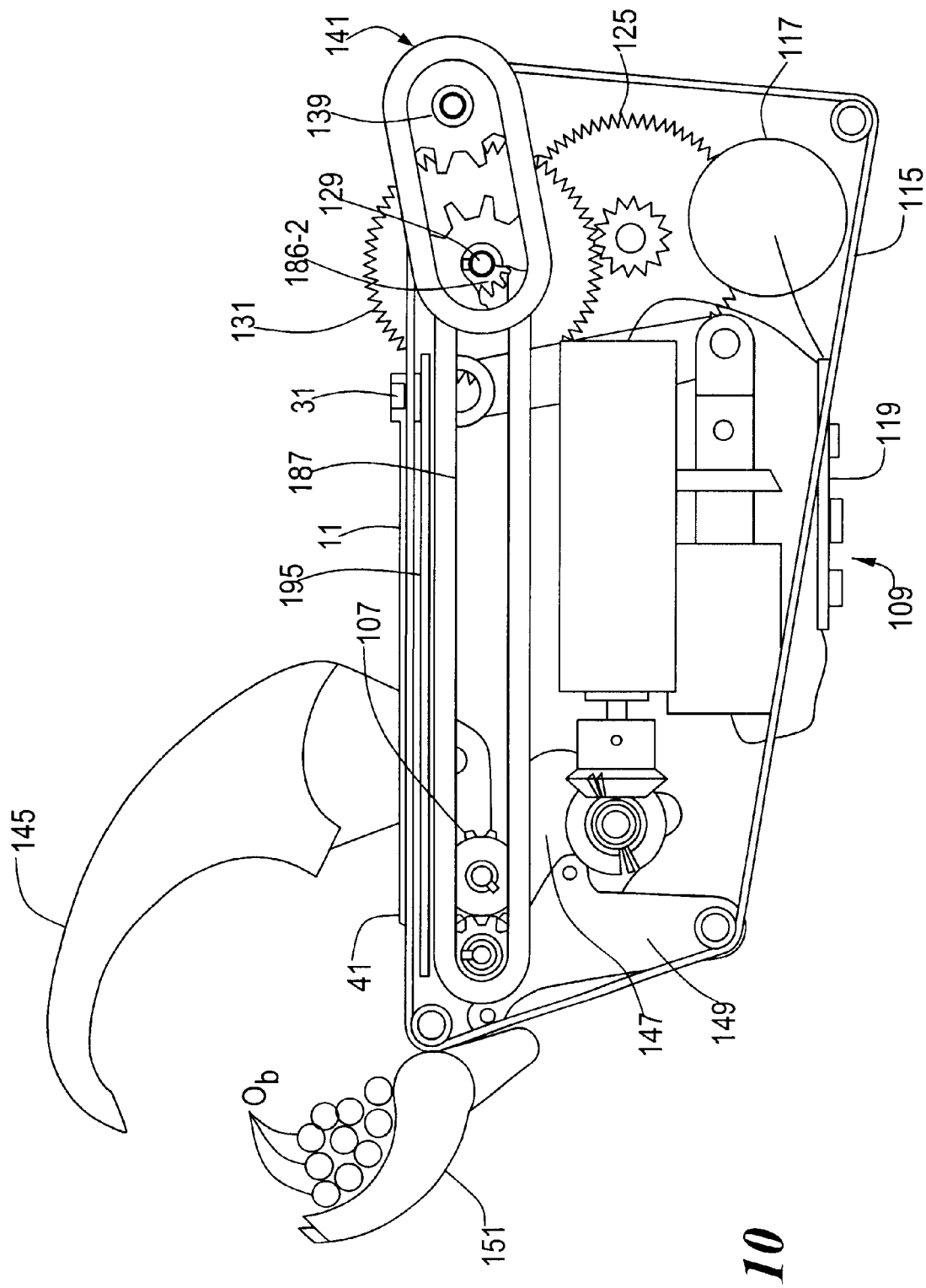
FIG. 10 is a front plan view, broken away in part, of various components of the cable tie installation tool shown in FIG. 9, the tool being shown with a plurality of objects to be bundled disposed on the lower jaw and with the cable tie of FIG. 1 mounted on the transport belt.
Figure 11:
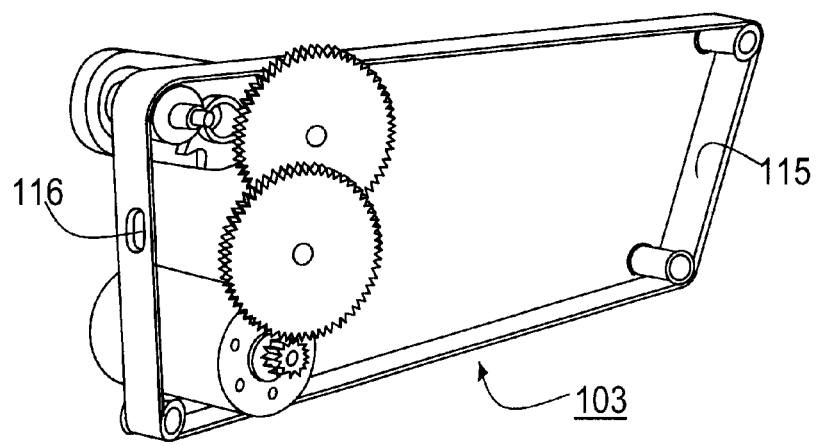
FIG. 11 is a rear perspective view of the transport assembly shown in FIG. 10.
Figure 12:
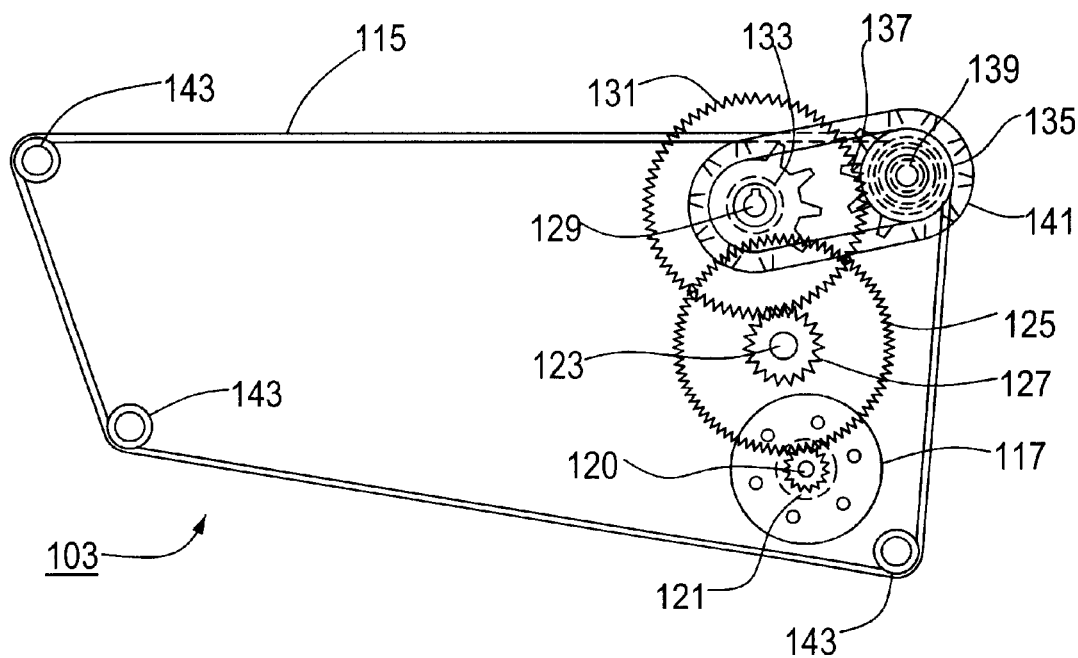
FIG. 12 is a front plan view of the transport assembly shown in FIG. 10, certain hidden components of the transport assembly being shown in solid line form rather than dashed line form for viewing purposes.

Referring now to FIGS. 11 and 12, transport assembly 103 is disposed within housing 101 and comprises a Kevlar/Urethane timing belt 115 which is shaped to define at least one opening 116 therein. Opening 116 is sized and shaped to fittingly receive head 13 of cable tie 11. Specifically, each cable tie 11 is capable of being individually, manually loaded into cable tie installation tool 12 with head 13 disposed snugly within opening 116. Loaded in this manner, bottom surface 36 of wings 31 are supported on belt 115 to prevent head 13 from falling entirely through opening 116. Furthermore, with head 13 properly positioned within opening 116, tail 15 lies flat along belt 115 so that free end 41 points forward towards jaw assembly 105, as shown in FIG. 10.

Transport belt 115 is rotatably driven by a variable speed motor 117 which is electrically connected to a mechanically squeezable trigger 118 through control circuit 109. Motor 117 comprises a rotatable axle 120 and a gear 121 fixedly mounted onto axle 120. A rotatable axle 123 comprising an outer gear 125 fixedly mounted on axle 123 and an inner gear 127 fixedly mounted on axle 123 is disposed such that gear 125 engages gear 121. Similarly, a rotatable axle 129 comprising an outer gear 131 fixedly mounted on axle 129 and a sprocket 133 fixedly mounted on axle 129 is disposed such that gear 131 engages gear 127. A rotatable pulley 135 having a sprocket 137 fixedly mounted on pulley 135 and a clutch 139 mounted on pulley 135 is spaced apart from axle 129. A feed chain 141 is mounted on sprockets 133 and 137 so as to rotatably couple sprockets 133 and 137 together. A plurality of passive pulleys 143 are spaced apart from pulley 135 and transport belt 115 is tightly positioned around pulleys 143 and 135.

Accordingly, depression of trigger 118 causes control circuit 109 to activate transport assembly 103. Specifically, upon the initial depression of trigger 118, control circuit 109 causes axle 120 and gear 121 of motor 117 to rotate at full speed in a counterclockwise direction which, in turn, causes gear 125 to rotate in a clockwise direction. Clockwise rotation of gear 125 similarly causes inner gear 127 to rotate in a clockwise direction which, in turn, drives outer gear 131 in a counterclockwise direction. Counterclockwise rotation of outer gear 131 similarly causes sprocket 133 to rotate in a counterclockwise direction which, in turn, drives feed chain 141 in a counterclockwise direction. Counterclockwise rotation of feed chain 141 drives sprocket 137 in a counterclockwise direction which, in turn, rotates pulley 135 in a counterclockwise direction. The counterclockwise rotation of pulley 135 drives transport belt 115 at full speed in a counterclockwise direction with passive pulleys 143 rotating in a counterclockwise direction with belt 115.

Figure 22A:
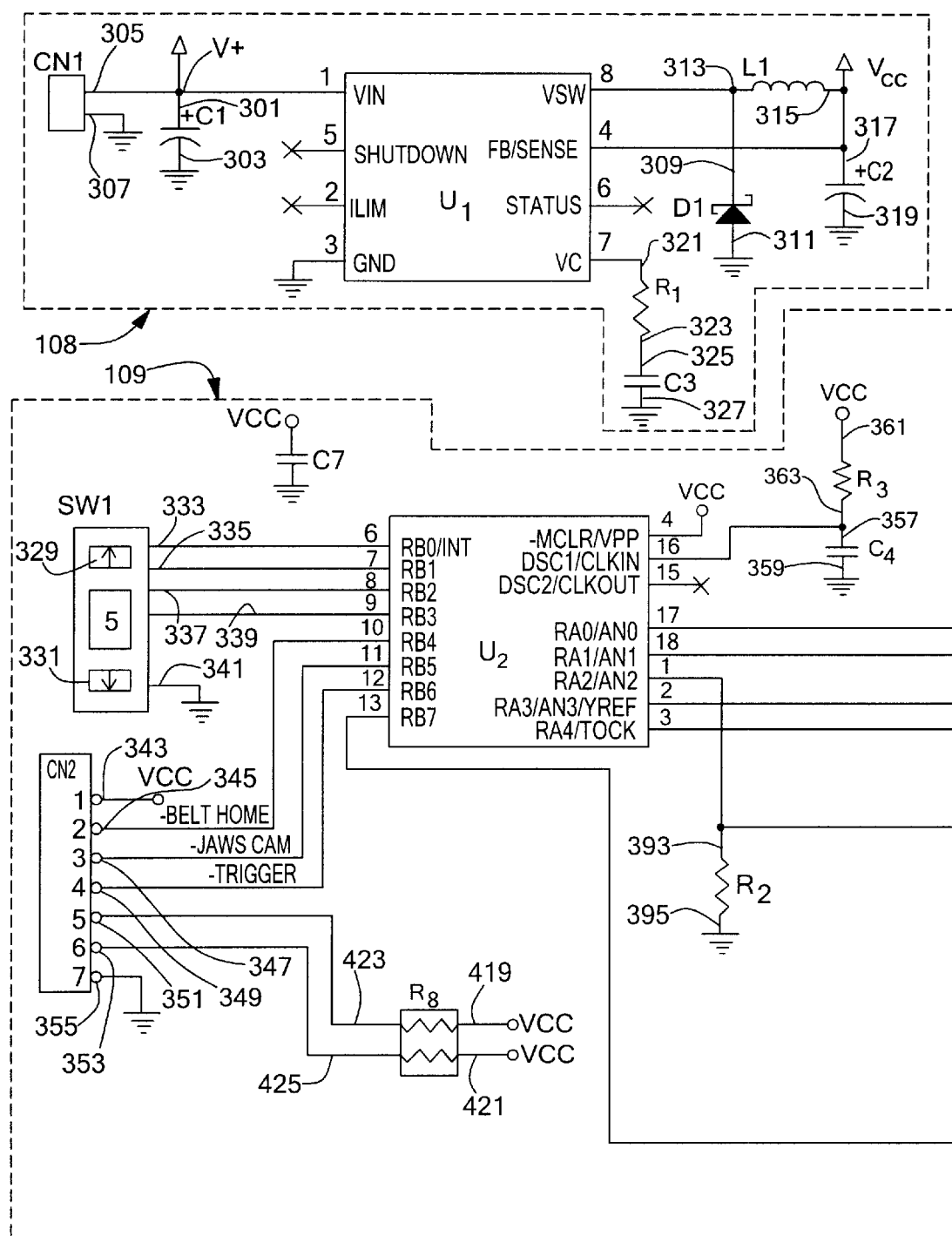
FIG. 22 is a schematic representation of the main printed circuit board shown in FIG. 10.
Figure 22B:
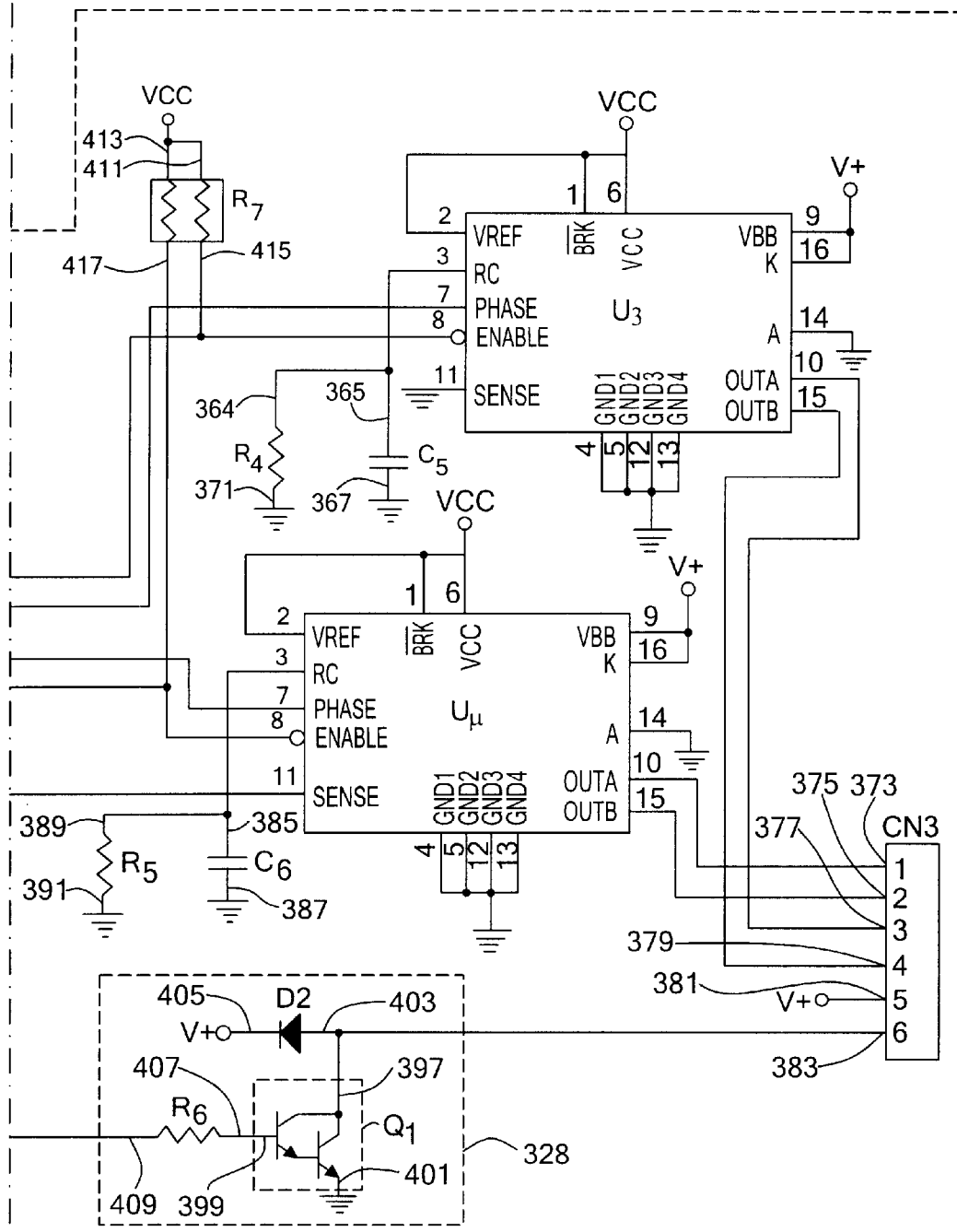

With cable tie 11 disposed within opening 116, control circuit 109 continues to control that motor 117 drives transport belt 115 at full speed in a counterclockwise direction. Cable tie 11 advances at full speed in a counterclockwise direction until a belt sensor R8, as shown in FIG. 22, detects that cable tie 11 is approaching jaw assembly 105. Once belt sensor R8 detects that cable tie 11 is approaching jaw assembly 105, control circuit 109 regulates motor 117 to incrementally advance at a creeping, or pulsing rate, in the counterclockwise direction until a jaw sensor R7, as shown in FIG. 22, detects that cable tie 11 is accurately positioned within jaw assembly 105. Once cable tie 11 is accurately positioned within jaw assembly 105, control circuit 109 regulates motor 117 to stop rotating in the counterclockwise direction. With cable tie 11 positioned as such, jaw assembly 105 can drive tail 15 through head 13 and cinch assembly 107 can further close the loop formed by cable tie 11 around its desired bundle, as will be described further in detail below.

It should be noted that third side panels 35 of wings 31 abut against housing 101 when cable tie 11 is accurately positioned within jaw assembly 105. Specifically, housing 101 is shaped to include on its inner surface a pair of hard alignment stops (not shown) onto which third side panels 35 abut. In this manner, the abutment of panels 35 of cable tie 11 against the hard alignment stops serves to properly position head 13 within jaw assembly 105 before tail 15 is fed through head 13, which is highly desirable.

It should also be noted that control circuit 109 slows down motor 117 as head 13 of cable tie 11 approaches jaw assembly 105 in order to prevent hard contact between cable tie 11 and the pair of hard alignment stops formed in housing 101, thereby reducing any chance of damage and/or malfunction in the bundling process.

As noted above, control circuit 109 drives motor 117 in the counterclockwise direction in order for transport assembly 103 to advance cable tie 11 into jaw assembly 105. In addition, as will be described further in detail below, control circuit 109 also drives motor 117 in the clockwise direction in order for cinch assembly 107 to tension cable tie 11 around its desired bundle. Accordingly, clutch 139 serves to prevent transport belt 115 from advancing in the clockwise direction when motor 117 is driven clockwise by control circuit 109 to activate cinch assembly 107, which is highly desirable.

Jaw Assembly for the Cable Tie Installation Tool

Referring now to FIGS. 13-18, jaw assembly 105 comprises an upper jaw 145, a cam 147, a linkage 149, a lower jaw 151 and a jaw assembly motor 153 which is electrically connected to control circuit 109. As will be described further in detail below, once trigger 118 is activated, control circuit 109 activates motor 153 which, in turn, enables jaw assembly 105 to guide tail 15 through head 13 to form cable tie 11 into a closed loop around the desired bundle of objects $O_b$.

Upper jaw 145 comprises a first end 155, a second end 157 and a roller 159 rotatably mounted at second end 157. As will be described further in detail below, upper jaw 145 is capable of rotation about a pivot point 161.

Cam 147 is an integrally formed piece which is rotatably driven in the counterclockwise direction by motor 153 during operation. Cam 147 comprises a generally cylindrical shaft 163 which is adapted to rotate about a cam pivot point 165. Cam 147 further comprises first and second cam lobes 167 and 169 which project out from shaft 163. Preferably, lobes 167 and 169 are integrally formed onto shaft 163 to make cam 147 one piece. However, it is to be understood that cam 147 could alternatively be constructed from multiple separate pieces without departing from the spirit of the present invention.

Linkage 149 is generally T-shaped and comprises first and second rollers 171 and 173 rotatably mounted thereon. As will be described further in detail below, linkage 149 is capable of rotation about a pivot point 175.

Lower jaw 151 comprises a first end 177 and a second end 179. As will be described further in detail below, lower jaw 151 is capable of rotation about a pivot point 181.

Roller 159 on upper jaw 145 is disposed to continuously contact either the outer periphery of first cam lobe 167 or the outer periphery of shaft 163. Similarly, roller 171 on linkage 149 is disposed to continuously contact either the outer periphery of second cam lobe 169 or the outer periphery of shaft 163. Furthermore, roller 173 on linkage 149 is disposed to continuously contact second end 179 of lower jaw 151.

Figure 13:
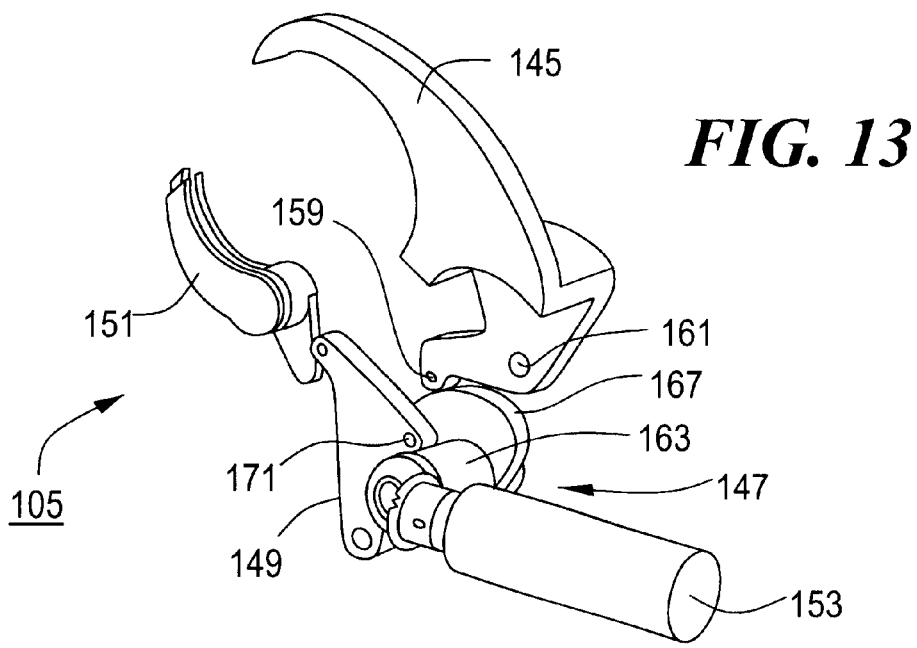
FIG. 13 is a front perspective view of the jaw assembly shown in FIG. 10, the jaw assembly being shown in its open configuration.
Figure 14:
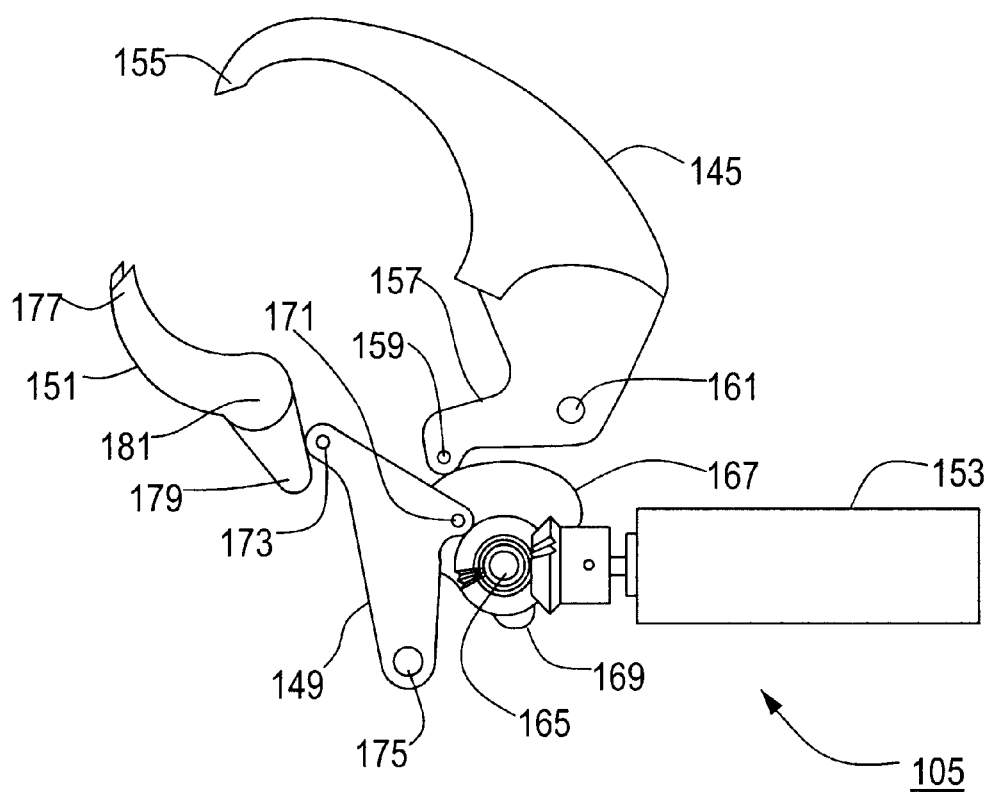
FIG. 14 is a front plan view of the jaw assembly shown in FIG. 10, the jaw assembly being shown in its open configuration.
Figure 15:
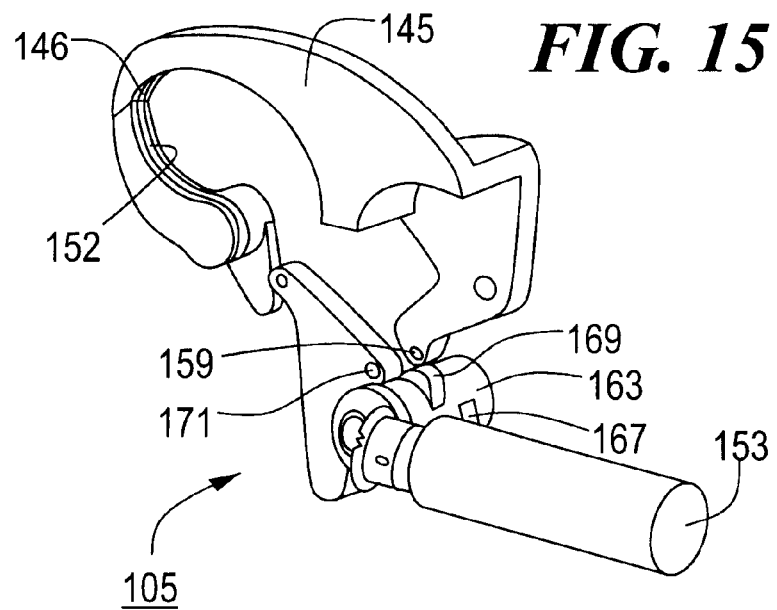
FIG. 15 is a front perspective view of the jaw assembly shown in FIG. 10, the jaw assembly being shown in its closed configuration.
Figure 16:
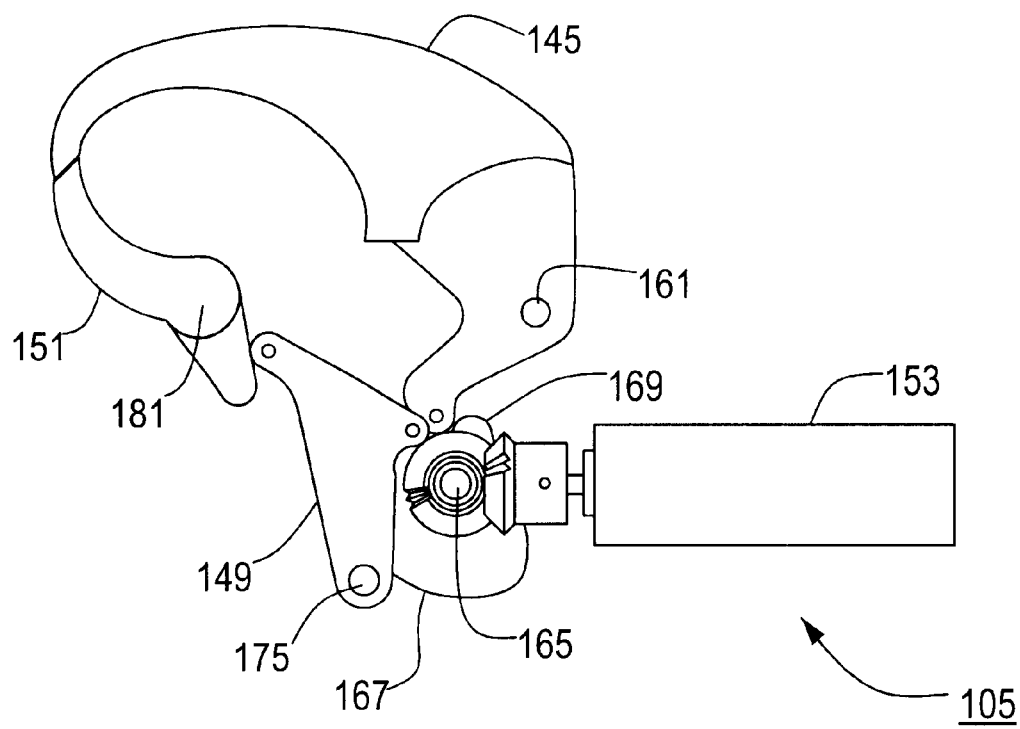
FIG. 16 is a front plan view of the jaw assembly shown in FIG. 10, the jaw assembly being shown in its closed configuration.

Accordingly, with jaw assembly 105 disposed in its open position, as shown in FIGS. 13 and 14, the depression of trigger 118 causes control circuit 109 to activate motor 153 which, in turn, continuously drives cam 147 in a counterclockwise direction. As cam 147 rotates in a counterclockwise direction about cam pivot point 165, eventually roller 159 on upper jaw 145 slides downward from contacting first cam lobe 167 and contacts shaft 163. The downward movement of roller 159 pivots upper jaw 145 in a counterclockwise direction about pivot point 161 until jaw assembly 105 is disposed into its closed position, as shown in FIGS. 15 and 16.

Figure 17:
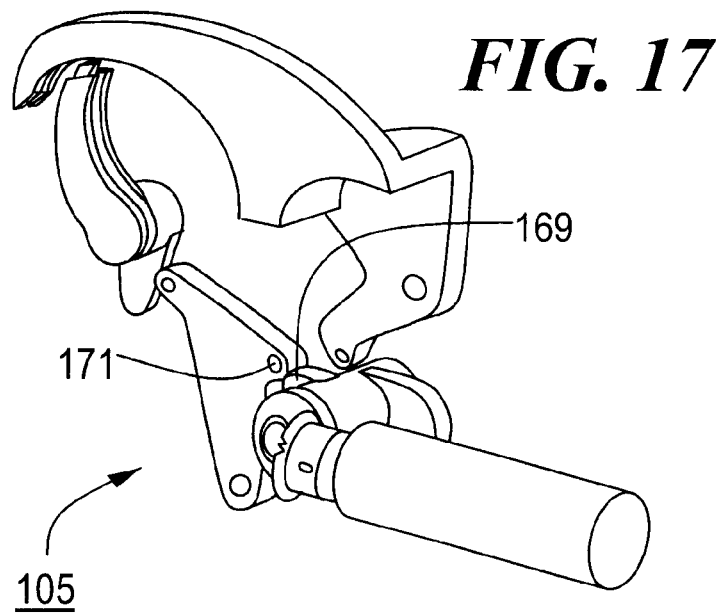
FIG. 17 is a front perspective view of the jaw assembly shown in FIG. 10, the jaw assembly being shown in its overdosed configuration.
Figure 18:
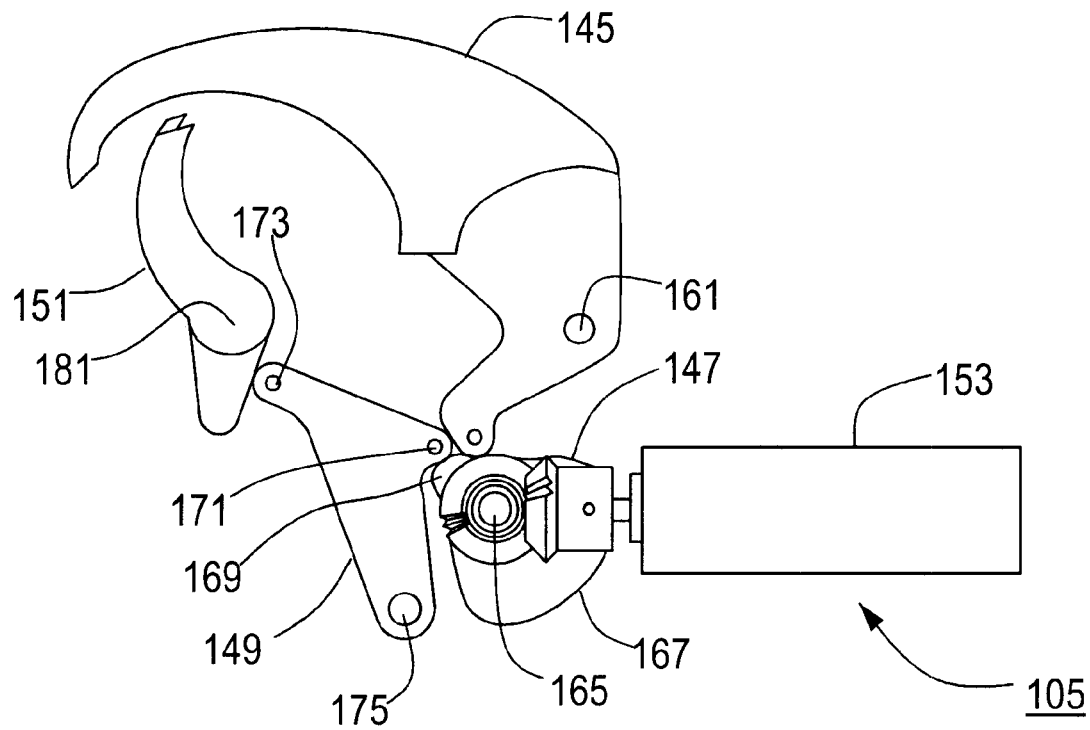
FIG. 18 is a front plan view of the jaw assembly shown in FIG. 10, the jaw assembly being shown in its overdosed configuration.

Continued counterclockwise rotation of cam 147 about cam pivot point 165 eventually causes second cam lobe 169 to urge roller 171 in the direction away from cam pivot point 165. Specifically, continued rotation of cam 147 causes roller 171 to move from contacting shaft 163 and slide outward so as to contact second cam lobe 169. The lateral movement of roller 171 away from cam pivot point 165 causes linkage 149 to rotate in a counterclockwise direction about linkage pivot point 175 which, in turn, causes roller 173 to rotate lower jaw 151 in a clockwise direction about lower jaw pivot point 181 until jaw assembly 105 is disposed into its overdosed position, as shown in FIGS. 17 and 18.

As cam 147 further rotates in the counterclockwise direction about cam pivot point 165, eventually roller 159 slides upward from contacting shaft 163 and contacts first cam lobe 167. Simultaneously, roller 171 slides inward towards cam pivot point 165 as roller 171 slides in from contacting second cam lobe 169 and contacts shaft 163. As a result, jaw assembly 105 returns to its original open position, as shown in FIGS. 13 and 14, in anticipation of the cinching, tensioning and cutting processes, which will be described in detail below.

It should be noted that the particular size, shape and positioning of cam lobes 167 and 169 effect the relative orientation and timing sequence of the open, close and overdose configurations of upper jaw 145 and lower jaw 151. As such, the particular size, shape and positioning of cam lobes 167 and 169 disposes jaw assembly 105 in its overdose position for a relatively short duration and then subsequently disposes jaw assembly 105 into its open position. Resultingly, jaw assembly 105 is disposed in its open configuration during the cinching process, thereby keeping jaws 145 and 151 from hindering proper cinching, which is highly desirable.

Cinch Assembly for the Cable Tie Installation Tool

Figure 19:
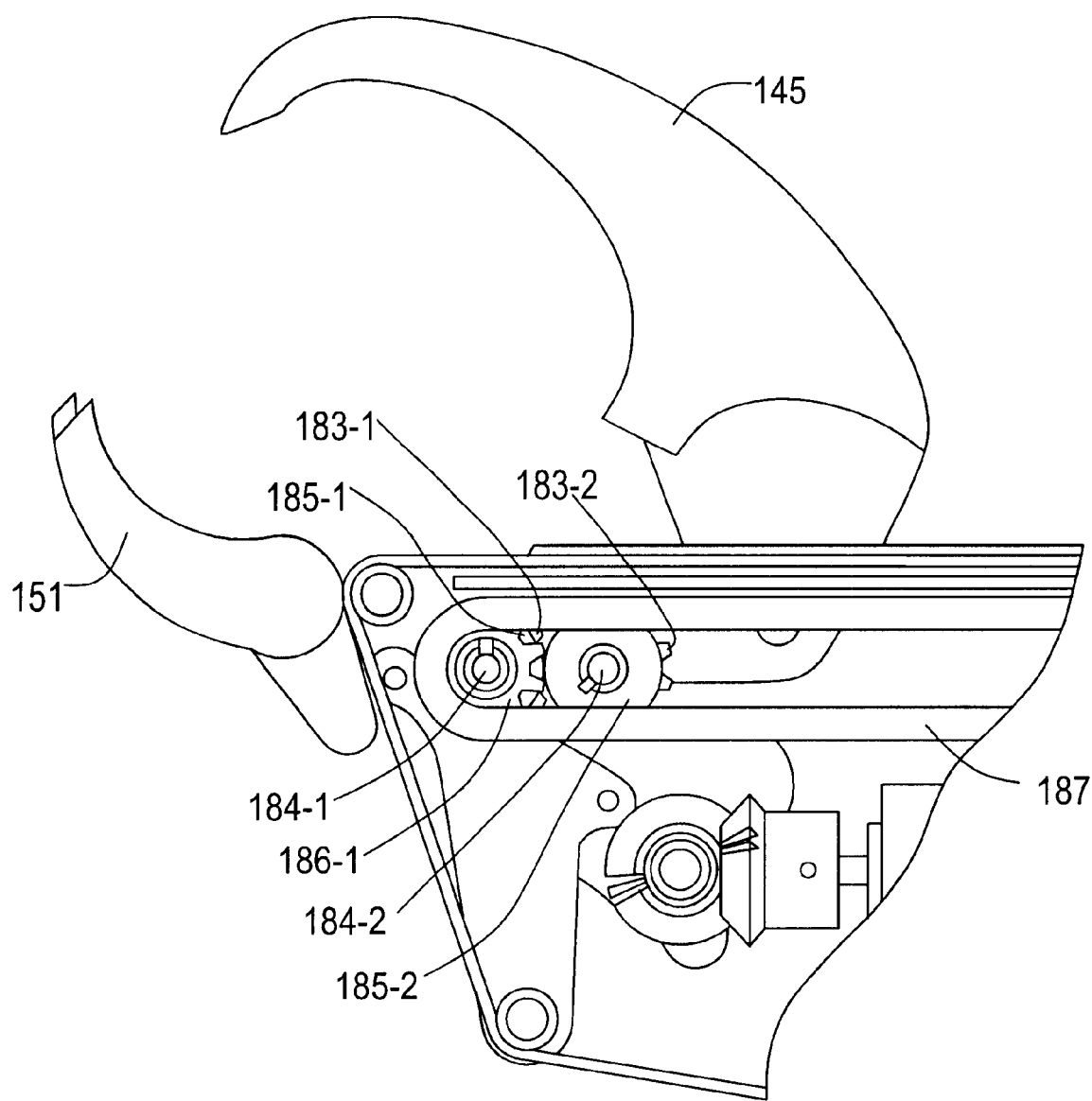
FIG. 19 is an enlarged, fragmentary front plan view of the various components of the cable tie installation tool shown in FIG. 10.

Referring now to FIGS. 10 and 19, cinch assembly 107 is disposed within housing 101 and comprises a first cinch knurl 183-1 fixedly mounted on a rotatable axle 184-1and a second cinch knurl 183-2 fixedly mounted on a rotatable axle 184-2. Furthermore, cinch assembly 107 comprises a first gear 185-1 fixedly mounted on rotatable axle 184-1 and a second gear 185-2 fixedly mounted on rotatable axle 184-2, first gear 185-1 and second gear 185-2 being disposed to continuously engage one another. First and second cinch knurls 183 are spaced slightly apart and include an outer periphery which is adapted to engage and pull tail 15 down therebetween. As such, cinch knurls 183 serve to advance tail 15 through head 13 so as to reduce the size of the closed loop of cable tie 11 formed around the desired bundle.

A cinch chain 187 is mounted on a chain gear 186-1 which is fixedly mounted on rotatable axle 184-1 and a chain gear 186-2 which is fixedly mounted on axle 129. Accordingly, while jaw assembly 105 advances tail 15 down through head 13 and between cinch knurls 183, control circuit 109 activates cinch assembly 107. Activation of cinch assembly 107 by control circuit 109 causes motor 117 to rotate in a clockwise direction which, in turn, causes gear 125 to rotate in a counterclockwise direction. Counterclockwise rotation of gear 125 similarly causes inner gear 127 to rotate in a counterclockwise direction which, in turn, drives outer gear 131 in a clockwise direction. Clockwise rotation of outer gear 131 similarly causes gear 186-2 to rotate in a clockwise direction which, in turn, drives cinch chain 187 in a clockwise direction. Rotation of cinch chain 187 in a clockwise direction drives gear 186-1 in a clockwise direction which, in turn, rotates gear 185-1 in a counterclockwise direction. Rotation of gear 185-1 in a counterclockwise direction drives gear 185-2 in a counterclockwise direction. As a result, the rotation of gear 185-1 in a clockwise direction drives cinch knurl 183-1 in a clockwise direction and the rotation of gear 185-2 in a counterclockwise direction drives cinch knurl 183-2 in a counterclockwise direction, thereby rotating cinch knurls 183 inwards towards each other so as to pull tail 15 down through head 13 to close the loop formed by cable tie 11 around the desired bundle.

As noted above, in order to drive cinch assembly 107, control circuit 109 causes motor 117 to rotate in the opposite direction than when motor 117 drives transport assembly 103. Accordingly, clutch 139 serves to prevent clockwise rotation of transport belt 115 when motor 117 rotates in the clockwise direction to drive cinch assembly 107, which is highly desirable.

Cut Assembly for the Cable Tie Installation Tool

Figure 20:
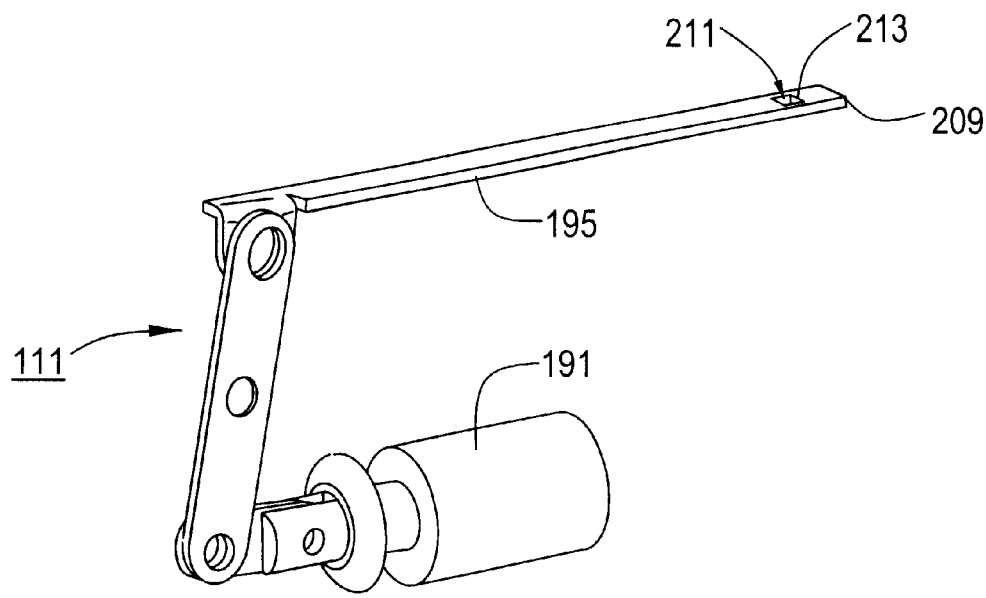
FIG. 20 is a rear perspective view of the cut assembly shown in FIG. 10.
Figure 21:
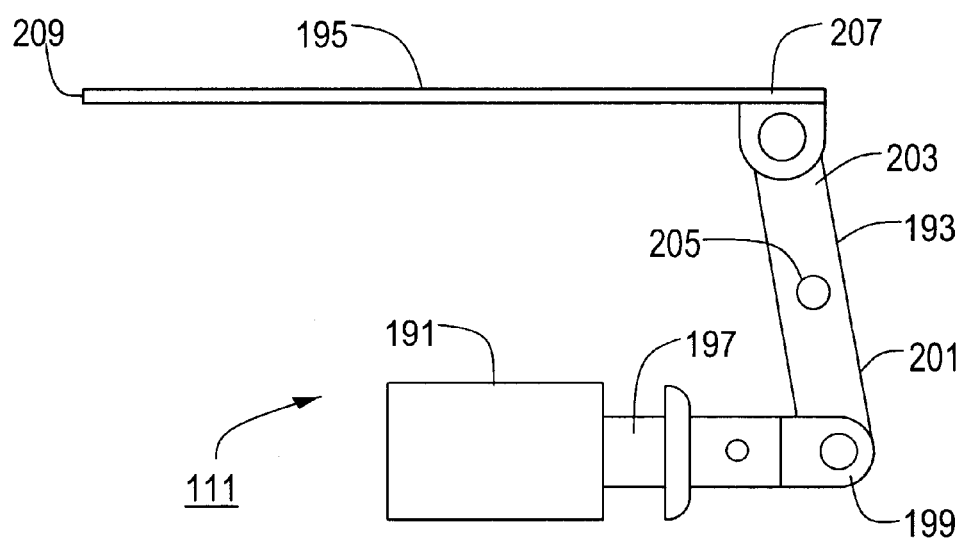
FIG. 21 is a front plan view of the cut assembly shown in FIG. 10.

Referring now to FIGS. 20-21, cut assembly 111 is disposed within housing 101 and comprises a solenoid 191 electrically connected to control circuit 109, a cut linkage 193 and a knife blade 195. Solenoid 191 is preferably a conventional solenoid which includes a slidably mounted plunger 197 having a free end 199. Plunger 197 of solenoid 191 is naturally disposed in an extended position, as shown in FIG. 21 and, upon activation of solenoid 191, plunger 197 slides inward. Linkage 193 comprises a first end 201 coupled to free end 199 of plunger 197 and a second end 203 and is disposed to rotate about link pivot point 205. Knife blade 195 comprises a first end 207 which is coupled to second end 203 of linkage 193, a second end 209 and an opening 211 formed therein proximate second end 209. Opening 211 is partially defined by a sharpened knife edge 213 proximate second end 209. As will be described further in detail below, the overclose configuration of jaw assembly 105 disposes tail 15 through head 13, through opening 211 and down between cinch knurls 183.

As will be described further in detail below, with tail 15 advanced through head 13 and through opening 211, once control circuit 109 detects that the desired tension level of cable tie 11 around the bundle is in effect, control circuit 109 activates solenoid 191. Referring now to FIG. 21, the activation of solenoid 191 pulls plunger 197 inward which, in turn, causes linkage 193 to rotate in a counterclockwise direction about link pivot point 205. The counterclockwise rotation of linkage 193 pulls knife blade 195 rearward so as to draw sharpened knife edge 213 in contact tail 15, thereby severing the strap excess.

Control Circuit for the Cable Tie Installation Tool

As shown in FIG. 10, a main printed circuit board 119 is electrically connected to motor 117, motor 153 and solenoid 191, main printed circuit board 119 being sized and shaped to fit within housing 101. As can be appreciated, a power supply circuit 108 for controlling the power supplied by a power source PS to motor 117, motor 153 and solenoid 191 is formed onto main printed circuit board 119. In addition, control circuit 109 is formed onto main printed circuit board 119.

It should be noted that the particular construction and operation of control circuit 109 serves as the principal feature of the present invention. As will be described further in detail below, control circuit 109 is responsible for, inter alia, controlling transport assembly 103, jaw assembly 105, cinch assembly 107 and cut assembly 111. Furthermore, control circuit 109 is responsible for electrically regulating the tension level of cable tie 11 around the desired bundle of objects $O_b$.

Referring now to FIG. 22, power supply circuit 108 converts a power source voltage V+ supplied from power source PS to a regulated voltage Vcc. Power supply circuit 108 comprises a microprocessor C2, a first capacitor C1, a connector CN1, a zener diode D1, an inductor L1, a second capacitor C2, a first resistor R1 and a third capacitor C3.

Microprocessor U1 preferably has a manufacturer part number of LT1176 and serves to control the power supplied from power source PS. Microprocessor U1 includes a plurality of pins. Specifically, microprocessor U1 includes an input voltage pin Vin which is connected to power source voltage V+. Microprocessor U1 also includes a pin FB/Sense which is connected to regulated voltage Vcc. Microprocessor U1 also includes a ground pin GND which is connected to ground. Microprocessor U1 further includes a pin VSW, a pin VC, a pin STATUS, a pin SHUTDOWN and a pin ILIM.

First capacitor C1 preferably has a value of 100 uF and includes a first terminal 301 connected to power source voltage V+ and a second terminal 303 connected to ground.

Connector CN1 is preferably a two-prong connector which includes a first prong 305 connected to power source voltage V+ and a second prong 307 connected to ground. It should be noted that connector CN1 is directly connected to power source PS. As a result, the power supplied by power source PS passes into power supply circuit 108 through connector CN1.

Zener diode D1 preferably has a manufacturer part number of 1N5819 and includes a first terminal 309 which is connected to pin VSW and a second terminal 311 which is connected to ground.

Inductor L1 preferably has a value of 100 uH and includes a first terminal 313 connected to the first terminal 309 of zener diode D1 and a second terminal 35 connected to regulated voltage Vcc.

Second capacitor C2 preferably has a value of 220 uF and includes a first terminal 317 connected to regulated voltage Vcc and a second terminal 319 connected to ground.

First resistor R1 preferably has a value of 2.7 Kohms and includes a first terminal 321 connected to pin VC and a second terminal 323. Third capacitor C3 preferably has a value of 0.01 uF and includes a first terminal 325 connected to second terminal 323 and a second terminal 327 connected to ground.

In use, power supply circuit 108 regulates power source voltage V+ provided by power source PS down to the lower regulated voltage Vcc. Specifically, power supply circuit 108 lowers power source voltage V+ from a typical value of approximately 24 volts so as to provide regulated voltage Vcc with a value of approximately 5 volts. As can be appreciated, the stepping down of power source voltage V+ to regulated voltage Vcc is required in order to drive control circuit 109.

It should be noted that power source PS is represented in FIG. 10 as a portable battery pack which can be disposed within housing 101 of tool 12. However, it is to be understood that power source PS could be replaced with alternative types of power sources, such as a power cord which can be connected to a conventional wall outlet or to an operator wearable battery pack, without departing from the spirit of the present invention.

Control circuit 109 is formed onto main printed circuit board 119 in electrical connection with power supply circuit 108 and comprises a main microprocessor U2, a switch SW1, a seven-prong connector CN2, a first motor driver microprocessor U3, a sense resistor R2, a resistor R3, a capacitor C4, a first motor driver microprocessor U3, a fourth resistor R4, a fifth capacitor C5, a six-prong connector CN3, a second motor driver microprocessor U4, a fifth resistor R5, a sixth capacitor C6, a solenoid circuit 328, a first pair of photo interrupters, or jaw sensor, R7 and a second pair of photo interrupters, or belt sensor, R8.

Main microprocessor U2 preferably has a manufacturer part number of PIC16C710 and serves to control the principal functions of tool 12. Main microprocessor U2 includes a plurality of pins. Specifically, microprocessor U2 includes a pin –MCLR/VPP which is connected to regulated voltage Vcc. In addition, main microprocessor U2 includes a pin RB0/INT, a pin RB1, a pin RB2, a pin RB3, a pin RB4, a pin RB5, a pin RB6, a pin RB7, a pin DSC1I/CLKIN, a pin OSC2/CLKOUT, a pin RA0/AN0, a pin RA1/AN1, a pin RA2/AN2, a pin RA3/AN3/YREF and a pin RA4/TOCK.

Switch SW1 is preferably a manually operable pushbutton, or thumb, switch which is fixedly mounted onto housing 101, as shown in FIG. 9. Switch SW1 includes a first terminal 333 connected to pin RB0/INT, a second terminal 335 connected to pin RB1, a third terminal 337 connected to pin RB2, a fourth terminal 339 connected to pin RB3 and a fifth terminal 341 connected to ground.

As will be described further below, switch SW1 sends a signal to main microprocessor U2 specifying a user determined, maximum tension setting at which tool 12 forms tie 11 around the desired bundle. It should be noted that push-button switch SW1 is provided with a numerical indicator to identify to the operator the specific tension level at which cable tie tool 12 is set to wrap cable tie 11 around the desired bundle. For example, the numerical indicator of switch SW1 may range from its lowest numerical setting of 1 to its highest numerical setting of 5. With switch SW1 set at its lowest numerical setting of 1, tool 12 loosely wraps an individual cable tie 11 around the bundle. With switch SW2 set at its highest numerical setting of 5, tool 12 tightly wraps an individual cable tie 11 around the bundle. Switch SW1 includes an upper button 329 for increasing the tension level for tool 12 and a lower button 331 for decreasing the tension level for tool 12.

It should be noted that the tool 11 is not limited to push-button switch SW1. Rather, it is to be understood that tool 11 could replace push-button switch SW1 with any conventional control switch or knob without departing from the spirit of the present invention.

Connector CN2 is preferably a seven-prong connector which includes a first prong 343 connected to regulated voltage Vcc, a second prong 345 connected to pin RB4 of main microprocessor U2, a third prong 347 connected to pin RB5 of main microprocessor U2, a fourth prong 349 connected to pin RB6 of main microprocessor U2, a fifth prong 351, a sixth prong 353 and a seventh prong 355 connected to ground. It should be noted that main microprocessor U2 is able, through connector CN2, to monitor the stage of the bundling process at which tool 12 is operating.

Fourth capacitor C4 preferably has a value of 0.01 uF and includes a first terminal 357 connected to pin DSC1/CLKIN of main microprocessor U2 and a second terminal 359 connected to ground. Third resistor R3 preferably has a value of 47 Kohms and includes a first terminal 361 connected to regulated voltage Vcc and a second terminal 363 connected to first terminal 357 of fourth capacitor C4. Together, fourth capacitor C4 and third resistor R3 cause main microprocessor U3 to oscillate.

First motor driver microprocessor U3 preferably has a manufacturer part number of A3952SB and serves to control the power supplied to motor 153 which, in turn, drives jaw assembly 105. First motor driven microprocessor U3 includes a plurality of pins. Specifically, first motor driver microprocessor U3 includes a pin PHASE which is connected to pin RA1/AN1 of main microprocessor U2 and a pin ENABLE which is connected to pin RA0/AN0 of main microprocessor U2. First motor driver microprocessor U3 also includes a pin SENSE, a pin A, a pin GND1, a pin GND2, a pin GND3 and a pin GND4 which are all connected to ground. First motor driver microprocessor U3 further includes a pin VREF, a pin BRK and a pin VCC which are all connected to regulated voltage Vcc. First motor driver microprocessor U3 additionally includes a pin Vbb and a pin K which are both connected to power source voltage V+. First motor driver microprocessor U3 also includes a pin RC, a pin OUTA and a pin OUTB.

Fifth capacitor C5 preferably has a value of 1000 pF and includes a first terminal 365 connected to pin RC of first motor driver microprocessor U3 and a second terminal 367 connected to ground. Fourth resistor R4 preferably has a value of 22 Kohms and includes a first terminal 369 connected to first terminal 365 of fifth capacitor C5 and a second terminal 371 connected to ground.

Connector CN3 is preferably a six-prong connector which includes a first prong 373, a second prong 375, a third prong 377 connected to pin OUTA of first motor driver microprocessor U3, a fourth prong 379 connected to pin OUTB of first motor driver microprocessor U3, a fifth prong 381 connected to power source voltage V+ and a sixth prong 383. It should be noted that connector CN3 is additionally connected to positive and negative terminals of motor 117, motor 153 and solenoid 191. As such, main microprocessor U2 is able, through microprocessor U3, microprocessor U4 and connector CN3, to regulate the operation of motor 117, motor 153 and solenoid 191.

As will be described further below, first motor driver microprocessor U3 receives input signals from pin PHASE and pin ENABLE which, in turn, are driven by main microprocessor U2. In response to the input signals, first motor driver microprocessor U3 sends output signals through pin OUTA and pin OUTB which, in turn, drive motor 153 of jaw assembly 105.

Second motor driver microprocessor U4 preferably has a manufacturer part number of A3952SB and serves to control the power supplied to motor 117 which, in turn, drives both transport assembly 103 and cinch assembly 107. Second motor driver microprocessor U4 includes a plurality of pins. Specifically, second motor driver microprocessor U4 includes a pin PHASE which is connected to pin RA3/AN3/YREF of main microprocessor U2, a pin ENABLE which is connected to pin RA4/TOCK of main microprocessor U2 and a pin SENSE which is connected to pin RA2/AN2 of main microprocessor U2. Second motor driver microprocessor U4 also includes a pin A, a pin GND1, a pin GND2, a pin GND3 and a pin GND4 which are all connected to ground. Second motor driver microprocessor U4 further includes a pin VREF, a pin BRK and a pin VCC which are all connected to regulated voltage Vcc. Second motor driver microprocessor U4 additionally includes a pin Vbb and a pin K which are both connected to power source voltage V+. Second motor driver microprocessor U4 also includes a pin RC, a pin OUTA and a pin OUTB, pin OUTA being connected to first prong 373 of connector CN3 and pin OUTB being connected to second prong 375 of connector CN3.

Sixth capacitor C6 preferably has a value of 1000 pF and includes a first terminal 385 connected to pin RC of second motor driver microprocessor U4 and a second terminal 387 connected to ground. Fifth resistor R5 preferably has a value of 22 Kohms and includes a first terminal 389 connected to first terminal 385 of sixth capacitor C6 and a second terminal 391 connected to ground.

As will be described further below, second motor driver microprocessor U4 receives input signals from pin PHASE and pin ENABLE which, in turn, are driven by main microprocessor U2. In response to the input signals, second motor driver microprocessor U4 sends output signals through pin OUTA and pin OUTB which, in turn, drive motor 117.

Sense resistor R2 preferably has a value of 0.22 ohms and includes a first terminal 393 connected to pin SENSE of second motor driver microprocessor U4 and a second terminal 395 connected to ground. As can be appreciated, sense resistor R2 is used to monitor the current draw of second motor driver microprocessor U4 which, in turn, is required to power motor 117. Specifically, since sense resistor R2 has a small value, a relatively small voltage is created across sense resistor R2 which is directly proportional to the current draw of motor 117. Sense resistor R2 additionally connects to the analog to digital converter pin RA2/AN2 of main microprocessor U2, thereby enabling main microprocessor U2 to regulate the current draw of motor 117. As can be appreciated, main microprocessor U2 electrically regulates the tension level of the closed loop formed by cable tie 11 by monitoring the current draw of motor 117, as will be described further in detail below.

Solenoid circuit 328 serves to control the power supplied to solenoid 191 which, in turn, drives knife blade 195. Solenoid circuit 328 comprises a transistor Q1, a diode D2 and a resistor R6. Solenoid circuit 328 is preferably in the form of a Darlington circuit having a manufacturer part number of 2N6D38, transistor Q1 including a first terminal 397 connected to sixth prong 383 of connector CN3, a second terminal 399 and a third terminal 401 connected to ground. Diode D2 preferably has a manufacturer part number of 1N40D4 and includes a first terminal 403 connected to first terminal 397 of transistor Q1 and a second terminal 405 connected to power source voltage V+. Sixth resistor R6 preferably has a value of 470 ohms and includes a first terminal 407 connected to second terminal 399 of transistor Q1 and a second terminal 409 connected to pin RB7 of main microprocessor U2.

As will be described further below, when main microprocessor U2 determines that the desired tension level of cable tie 11 has been met, main microprocessor U2 drives transistor Q1 on which, in turn, activates solenoid 191. The activation of solenoid 191 pulls knife blade 195 in such a manner so as to sever the excess portion of tail 15 of cable tie 11. After solenoid 191 has been activated, main microprocessor U2 turns transistor Q1 back off.

Jaw sensor R7 preferably has a value of 100 kohms and includes a first terminal 411 connected to regulated voltage Vcc, a second terminal 413 connected to regulated voltage Vcc, a third terminal 415 connected to pin ENABLE of first motor driver microprocessor U3 and a fourth terminal 417 connected to pin ENABLE of second motor driver microprocessor U4.

Jaw sensor R8 preferably has a value of 220 ohms and may be of the type manufactured by HONEYWELL CORPORATION under model number HOA1887. Jaw sensor R8 includes a first terminal 419 connected to regulated voltage Vcc, a second terminal 421 connected to regulated voltage Vcc, a third terminal 423 connected to fifth prong 351 of connector CN2 and a fourth terminal 425 connected to sixth prong 353 of connector CN2.

A by-pass capacitor C7 having a value of 0.1 uF is preferably provided and serves to help quiet electrical noise for main microprocessor U2.

It should be noted that control circuit 109 serves to accurately regulate the tension of the closed loop formed by cable tie 11 around bundle of objects $O_b$ to a user adjustable, desired tension level using a combination of two separate techniques. Specifically, control circuit 109 regulates the tension of the closed loop formed by cable tie 11 around the bundle by regulating the voltage applied to motor 117 and electrically monitoring the current draw of motor 117. However, it is to be understood that the technique for regulating the tension of the closed loop formed by cable tie 11 of regulating the voltage applied to motor 117 could be eliminated from control circuit 109 without departing from the spirit of the present invention.

With respect to control circuit 109 regulating the voltage applied to motor 117, it should be noted that the regulation of the voltage applied to motor 117 serves to limit the maximum tension level at which cable tie 11 can be formed around the bundle. Specifically, varying the voltage applied to motor 117 changes the output torque of motor 117 which, in turn, regulates the ability of tool 12 to pull the bundle tight. In this manner, a higher amount of voltage applied to motor 117 results in increased tension around the bundle and a lower amount of voltage applied to motor 117 results in decreased tension around the bundle.

Control circuit 109 varies the voltage applied to motor 117 by intermittently interrupting the voltage applied to motor 117. Specifically, when thumb switch SW1 is set at its highest tension setting, control circuit 109 continuously applies voltage to motor 117. When thumb switch SW1 is set at its lowest tension setting, control circuit 109 applies a pulse of voltage to motor 117 for 1/16 of a second, and then withdraws voltage from motor 117 for 15/16 of a second. At the end of this cycle, the momentum of motor 117 starts to decrease. Once the momentum of motor 117 starts to decrease, control circuit 109 applies another pulse of voltage for 1/16 of a second to motor 117. The cycle repeats until cable tie 11 is wrapped around the bundle. Adjustments in the length of the pulse of voltage to motor 117, as well as the length of the withdrawal of voltage to motor 117, serves to regulate the voltage applied to motor 117, thereby regulating the tension formed around the bundle, which is highly desirable.

It should be noted that regulating the pulses of voltage to motor 117 serves to drive motor 117 at various torques, and thereby different tension levels, without significantly changing the speed of the motor. As a result, motor 117 experiences a nearly uniform cycle time regardless of the changes in its torque output, which is highly desirable.

It should also be noted that the aforementioned technique of regulating the voltage applied to motor 117 could be eliminated from control circuit 109 without departing from the spirit of the present invention. In fact, elimination of the technique of regulating the voltage applied to motor 117 would not effect the ability of control circuit 109 to accurately regulate the tension of the closed loop formed by cable tie 11 around bundle of objects $O_b$ to a user adjustable, desired tension level. Rather, elimination of the technique of regulating the voltage applied to motor 117 only serves to limit the range of potential tensioning levels.

With respect to control circuit 109 electrically monitoring the current draw of motor 117, it should be noted that the regulation of the current drawn by motor 117 serves to enable control circuit 109 to limit the tension level of the closed loop to a precise, user adjustable, setting. Specifically, with control circuit 109 monitoring the current draw of motor 117, as tail 15 of cable tie 11 is drawn down between cinch knurls 183, the current draw, or load, on motor 117 will eventually increase a significant level, thereby creating a spike in the amount of current draw required by motor 117. As can be appreciated, this "spike" in the current draw required by motor 117 notifies to control circuit 109 that cable tie 11 has reached its desired tension level. Accordingly, once control circuit 109 detects this "spike" in the current draw of motor 117, control circuit 109 instantaneously activates cut assembly 111 to sever the excess portion of tail 15 which is fed through head 13, cinch knurls 183 continuing to turn for a brief period so as to expel the excess portion of tail 15 into a waste compartment (not shown). Once the excess portion of tail 15 is expelled into a waste compartment, control circuit 109 causes motor 117 to terminate the cinching process.

As can be appreciated, the two particular techniques utilized by control circuit 109 to regulate the closed loop formed by cable tie 11 to a user adjustable, desired tension level introduce numerous advantages. Specifically, the two particular techniques utilized by control circuit 109 serve to minimize the cycle time of the cinching process, which is highly desirable. In addition, the two particular techniques utilized by control circuit 109 serve to increase the accuracy and consistency of the tension level created during the cinching process, which is highly desirable.

Bundling of a Cable Tie Using the Cable Tie Installation Tool

In use, cable tie 11 functions in conjunction with cable tie installation tool 12 to bundle a plurality of objects $O_b$ in the following manner. With jaw assembly 105 disposed in its initial open configuration, the plurality of objects $O_b$ to be bundled are disposed between upper jaw 145 and lower jaw 151, as shown in FIG. 10. An individual cable tie 11 is then manually fed through an opening 102 formed in the rear of housing 101 so that head 13 is disposed snugly within opening 116 formed in belt 115 and so that free end 41 lies on top of belt 115 and projects forward towards jaw assembly 105. With cable tie 11 properly loaded in belt 115, bottom surface 36 of wings 31 is supported on belt 115 to prevent head 13 from falling entirely through opening 116.

Having manually loaded an individual cable tie 11 into tool 12 in the manner specified above, trigger 118 is depressed by the operator. Upon the initial depression of trigger 118, control circuit 109 activates transport assembly 103 and jaw assembly 105. Specifically, control circuit 109 causes motor 117 to rotate at full speed in the counterclockwise direction which, in turn, causes belt 115 to rotate at full speed in the counterclockwise direction. As such, the activation of transport assembly 103 advances cable tie 11 forward towards jaw assembly 105. Simultaneously, jaw motor 153 drives jaw assembly 105 into its closed position.

Control circuit 109 continues to drive motor 117 at full speed in the counterclockwise direction until belt sensor R8 detects that tie 11 is approaching jaw assembly 105. Once belt sensor R8 detects that tie 11 is approaching jaw assembly 105, control circuit 109 drives motor 117 at a creeping, or cross-modulated, rate in the counterclockwise direction until jaw sensor R7 detects that tie 11 is properly loaded within jaw assembly 105, with third side panels 35 of wings 31 abutting against the hard alignment stops formed in housing 101. At that time, control circuit 109 terminates the activation of the transport assembly 103 and commences activation of cinch assembly 107.

As tie 11 is being properly loaded into jaw assembly 105, the continuous activation of motor 153 disposes jaw assembly 105 into its closed configuration. The closed configuration of jaw assembly 105 enables tail 15 to travel around the desired bundle through a track 152 formed in lower jaw 151 and a track 146 formed in upper jaw 145. As such, tail 15 is looped around the desired bundle and free end 41 is aligned to project into strap accepting channel 20.

With tail 15 looped around the desired bundle, jaw motor 153, which is in continuous rotation during the depression of trigger 118, drives jaw assembly 105 into a transitory overdosed configuration. The transitory overdosed configuration of jaw assembly 105 feeds free end 41 of tail 15 through strap accepting channel 20 so as to form cable tie 11 into a closed loop. The overdosed position of jaw assembly 105 also serves to feed tail 15 through strap accepting channel 20 until free end 41 projects through opening 211 in knife blade 195 and down between cinch knurls 183.

With free end 41 disposed between cinch knurls 183, jaw motor 153 begins to drive jaw assembly 105 into its open configuration while cinch assembly 107 continues its activation. Specifically, control circuit 109 causes motor 117 to rotate in a clockwise direction which, in turn, causes cinch knurls 183 to pull tail 15 down through head 13. As can be appreciated, clutch 139 prevents transport belt 115 from being moved by motor 117 in the clockwise direction, which is highly desirable.

Cinch assembly 107 advances tail 15 through head 13, thereby closing the size of the loop formed by cable tie 11 around the desired bundle. It should be noted that control circuit 109 varies the voltage supplied to motor 117 based upon the tension level set on thumb switch SW1 by the operator. As an example, a high tension setting applied to manual switch SW1 supplies a high voltage to motor 117, thereby increasing the torque output of motor 117. As another example, a low tension setting applied to manual switch SW1 supplies a low voltage to motor 117, thereby decreasing the torque output of motor 117.

Cinch assembly 107 advances tail 15 through head 13 until control circuit 109 electrically determines that a spike in the current draw of motor 117 has occurred. Once control circuit 109 detects this spike in the current draw of motor 117, thereby signifying that the desired tension level of tie 11 around the bundle has been reached, control circuit 109 activates cut assembly 111. Specifically, control circuit 109 activates solenoid 191 which, in turn, causes sharpened knife edge 213 to sever the excess portion of tail 15 which has been disposed through head 13. At this point, cinch knurls 183 continue to turn for a brief period so as to expel the excess portion of tail 15 into a waste compartment (not shown). Once the excess portion of tail 15 is expelled into a waste compartment, control circuit 109 causes motor 117 to terminate the cinching process, thereby completing the bundling cycle.

Upon completion of the bundling cycle, the operator releases trigger 118 and the wrapped bundle is removed from upper jaw 145 and lower jaw 151. This process for bundling plurality of objects $O_b$ using cable tie 11 in conjunction with cable tie installation tool 12 can be repeated as necessary.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cable tie installation tool for fastening a cable tie around a plurality of objects, said cable tie comprising a head and a tail formed onto said head, said head being adapted to cooperate with said tail to form a closed loop around the plurality of objects, said cable tie installation tool comprising:

(a) a first motor,
(b) a second motor,
(c) a jaw assembly driven by said first motor, said jaw assembly being adapted to guide the tail around the plurality of objects and through its associated head to form the cable tie into a closed loop around the plurality of objects,
(d) a transport assembly driven by said second motor, said transport assembly advancing the cable tie into said jaw assembly,
(e) a cinch assembly driven by said second motor, said cinch assembly advancing the tail through the head so as to reduce the size of the closed loop around the plurality of objects,
(f) a control circuit for controlling operation of said first motor and said second motor, said control circuit electrically monitoring the tension level of the closed loop around the bundle, said control circuit establishing a desired tension level, and
(g) a cut assembly for severing the excess portion of the tail fed through the head when said control circuit detects the desired tension level of the closed loop around the plurality of objects.

2. The cable tie installation tool as claimed in claim 1 wherein the desired tension level is user adjustable.

3. The cable tie installation tool as claimed in claim 2 wherein said control circuit electrically monitors the amount of current drawn from said second motor by said cinch assembly.

4. The cable tie installation tool as claimed in claim 3 wherein said control circuit comprises a main microprocessor for controlling the primary operations of said control circuit.

5. The cable tie installation tool as claimed in claim 4 wherein a first voltage is applied to said first motor and a second voltage is applied to said second motor.

6. The cable tie installation tool as claimed in claim 5 wherein said control circuit regulates the application of the second voltage to said second motor.

7. The cable tie installation tool as claimed in claim 6 wherein said control circuit regulates the application of the second voltage to said second motor by intermittently interrupting the application of the second voltage to said second motor.

8. The cable tie installation tool as claimed in claim 7 wherein said control circuit comprises a first motor driver microprocessor connected to said first motor for regulating the application of the first voltage to said first motor.

9. The cable tie installation tool as claimed in claim 8 wherein said control circuit comprises a second motor driver microprocessor connected to said second motor for regulating the application of the second voltage to said second motor.

10. The cable tie installation tool as claimed in claim 9 wherein said main microprocessor is connected to said first motor driver microprocessor and said second motor driver microprocessor, said main microprocessor controlling said first and second motor driver microprocessors.

11. The cable tie installation tool as claimed in claim 10 wherein said control circuit comprises a sense resistor connected to said second motor driver microprocessor and to said main microprocessor.

12. The cable tie installation tool as claimed in claim 11 wherein the current passing through said sense resistor is proportional to the amount of current drawn from said second motor by said cinch assembly, said main microprocessor electrically monitoring the current passing through said sense resistor.

13. A cable tie installation tool for fastening a cable tie around a plurality of objects, said cable tie comprising a head and a tail formed onto said head, said head being adapted to cooperate with said tail to form a closed loop around the plurality of objects, said cable tie installation tool comprising:

(a) a motor driven by a first voltage, (b) a jaw assembly adapted to guide the tail around the plurality of objects and through its associated head to form the cable tie into a closed loop around the plurality of objects, (c) a transport assembly for advancing the cable tie into said jaw assembly, (d) a cinch assembly driven by said motor, said cinch assembly advancing the tail through the head so as to reduce the size of the closed loop around the plurality of objects, (e) a control circuit for controlling the application of the first voltage to said motor, said control circuit electrically regulating the tension level of the closed loop around the bundle by monitoring the amount of current drawn from said motor by said cinch assembly, said control circuit establishing a desired tension level, the desired tension level being user adjustable, said control circuit adjusting the desired tension level by intermittently interrupting the application of the first voltage to said motor, and (f) a cut assembly for severing the excess portion of the tail fed through the head when said control circuit detects the desired tension level of the closed loop around the plurality of objects.

14. The cable tie installation tool as claimed in claim 13 wherein said control circuit adjusts the desired tension level by varying the length of the intermittent interruptions of the application of the first voltage to said motor.

15. The cable tie installation tool as claimed in claim 13 wherein said control circuit comprises:

(a) a main microprocessor for controlling the primary operations of said control circuit, and (b) a motor driver microprocessor connected to said main microprocessor and said motor, said motor driver microprocessor regulating the application of the voltage to said motor.

* * * * *